United States Patent Office 3,690,834
Patented Sept. 12, 1972

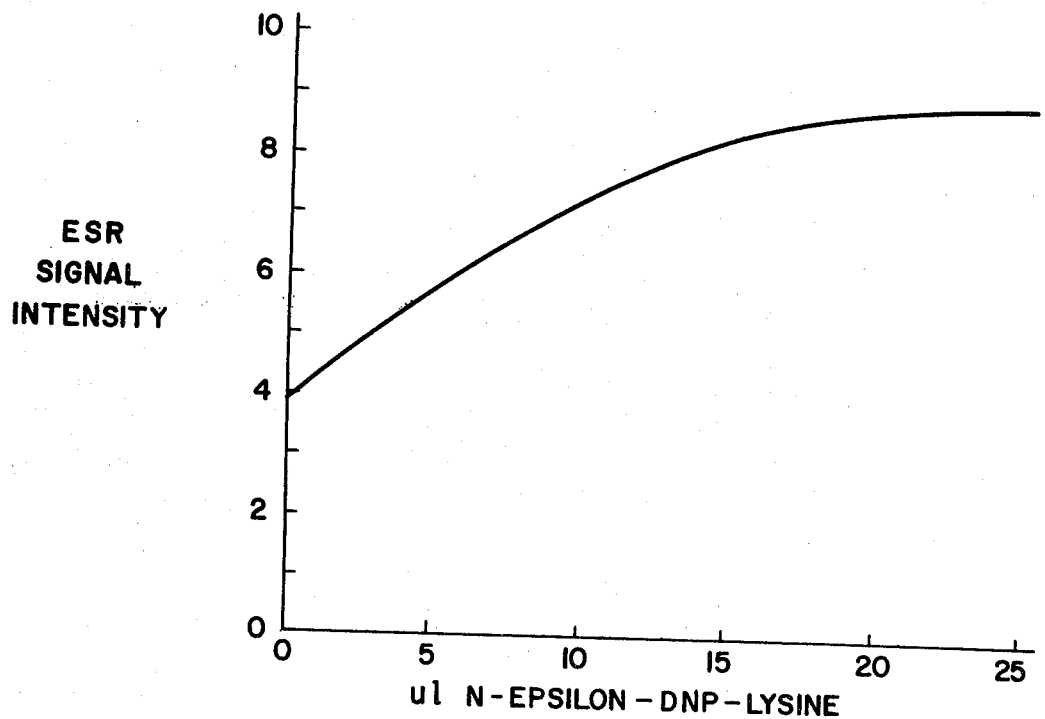
FIG_1
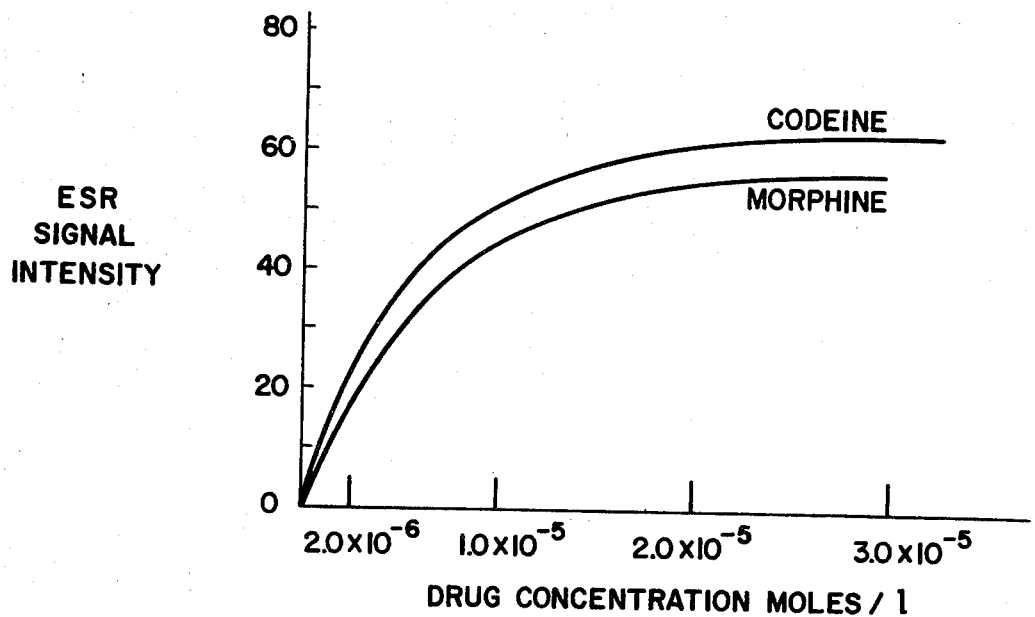
FIG_2

3,690,834
LIGAND DETERMINATION WITH SPIN LABELED COMPOUNDS BY RECEPTOR DISPLACEMENT
Avram Goldstein, Stanford, Richard K. Leute, Sunnyvale, and Edwin F. Ullman, Atherton, Calif., assignors to Syva Company
Continuation-in-part of application Ser. No. 105,535, Jan. 11, 1971. This application May 10, 1971, Ser. No. 141,516
Int. Cl. G01n 27/78, 33/16
U.S. Cl. 23—230 R
42 Claims

ABSTRACT OF THE DISCLOSURE

Organic compounds of biological interest can be determined at extremely low concentrations by combining in a medium, the composition to be determined, hereinafter referred to as ligand, a high molecular weight material of at least 10,000 molecular weight, which has a site spatially characteristic of the ligand, hereinafter referred to as receptor, and an analog of the ligand having a free radical functionality, hereinafter referred to as "ligand analog." The ligand analog and ligand in the medium compete for the receptor site, the amount of ligand analog bound to the receptor, being dependent on the amount of ligand present in the medium. By following the change in electron spin resonance spectrum of the ligand analog and comparing it to the change in spectrum which would be obtained in the absence of any ligand, the amount of ligand can be determined. Compounds are provided which are ligand analogs for use in the assay.

REFERENCE TO CO-PENDING APPLICATION

This application is a continuation-in-part of U.S. application Ser. No. 105,535, filed Jan. 11, 1971, now abandoned.

BACKGROUND OF THE INVENTION

Field of the invention

There is a continuing need for accurate and efficient methods for the rapid analysis of small quantities of organic compounds. Such need is related to widely different areas requiring the determination of minute quantities of organic materials. The need to assay diverse substances, from pollutants in water, soil or air which may be present in extremely small quantities to drugs or naturally occurring physiologically active materials, in body fluids, such as blood, urea and saliva, exemplifies the vast array of situations in which determinations of minute quantities of material are required.

More specifically, both as a medical and police function, the abuse of narcotics and drugs requires an easy method for rapid detection of the use of such drugs, either immediately after ingestion or injection or frequently, after a relatively extended period. The assay should be effective either for the drug, its metabolite, or both, individually or together, and should be specific for the drug being assayed, and not be interferred with by other materials which may be present in the body fluid.

Where the body is malfunctioning, it may be important to assay for particular compounds or metabolites, so as to diagnose the particular malfunction. Also, in case of poisonings, an easy and rapid method for determining the toxin, could be extremely important in providing the antidote.

A wide variety of methods exist for analyzing for a broad spectrum of different organic compounds. Many of these methods are dependent upon different types of detection instruments, such as fluorometers, ultraviolet spectrophotometers, gravimetric analyses, titrimetric analyses, etc. Other methods depend on thin layer chromatography, which is frequently slow, is subject to interference, and may not be reproducible. Because of the significant differences in the procedures, accuracies, and the presence of interfering materials, many diagnostic tests cannot be routinely carried out because of expense and lack of equipment.

DESCRIPTION OF THE PRIOR ART

The use of free radical probes with naturally occurring materials is found in U.S. Pats. Nos. 3,489,522 and 3,453,288. Labeling of various high molecular weight proteins is described in U.S. Pat. No. 3,481,952. See also Hubbell et al., Proc. Nat. Acad. Sci. U.S., 61, 12 (1968). Organic free radicals have been joined with antibodies and studied. L. Stryer and O. Hayes Griffith, Proc. Nat. Acad. Sci. U.S., 54, 1785 (1965); and J. C. Hsia and L. H. Piette, Arch, Biochem. and Biophys., 132, 466 (1969). In the latter reference, dinitrophenyl antibodies were labeled with 2,4-dinitrophenyl spin labels and the changes in the electron spin resonance (ESR) spectrum were observed as a result of the interaction between the label and antibodies.

Steroids have been spin labeled by either preparing the oxazole of the 3-keto steroid and oxidizing the nitrogen to the nitroxide or using a carboxyalkyl at the 17 position to form the amide of a tetramethyl(amino)piperidino-oxyl group. See McConnell et al., Quart. Rev. of Bisphys., 91–136 (1970); and Hamilton et al., Structural Chemistry and Molecular History, W. H. Freeman & Co., San Francisco, Calif. (1968), the chapter on Spin Labels. See also Hubbell, Proc. Natl. Acad. Sci. U.S., 63, 16 (1963).

See also co-pending application Ser. No. 794,008, filed Jan. 27, 1969, now abandoned, which discloses the use of nitroxide free radical compounds in determining the changes in pH.

SUMMARY OF THE INVENTION

The determination of extremely low concentrations of organic molecules of at least 6 carbon atoms and having at least 1 polar site can be achieved by bringing together a receptor molecule having a site which is configurationally characteristic of a ligand molecule, the specific ligand and a ligand analog having a similar spatial and polar configuration to the ligand, but varying in having present a stable free radical functionality. By determining the change in the electron spin resonance spectrum of the combination of the receptor, ligand and ligand analog, as compared to the spectrum of only the receptor and ligand analog, the concentration of the ligand can be determined with the use of known standards. The method finds particular use with biologically active compounds as the ligand, the nitroxide functionality as the free radical group and proteins as the receptor. Other free radical groups and receptors may be employed.

BRIEF DESCRIPTION OF THE DRAWINGS

FIG. 1 is a plot of the change in the electron spin resonance spectrum with addition of N-ε-dinitrophenyl lysine to a solution containing a complex of antibody and 1-oxyl-3-(2',4' - dinitrophenylamino) - 2,2,5,5 - tetramethylpyrrolidine.

FIG. 2 is a plot of the change in the electron spin resonance spectrum with the addition of morphine and codeine individually to a solution containing a complex of antibody and 3-[2'-(O³''-morphino)acetamide]-2,2,5, 5-tetramethylpyrrolidin-1-oxyl.

DESCRIPTION OF THE SPECIFIC EMBODIMENTS

Method

The subject invention is concerned with determining the amount of a specific material—"ligand"—in a solution by bringing together a high molecular weight material having a site characteristic of the polar nature and spatial geometry of the ligand to be determined—"receptor"—and a free radical analog of the ligand—"ligand analog." The electron spin resonance spectrum of the free radical functionality will vary when associated with a relatively small molecule, as compared to being associated with a substantially larger molecule. In a solution containing only ligand analog and receptor, at equilibrium the receptor sites will be substantially filled with ligand analog. Upon adding a small amount of ligand to the solution, the ligand and ligand analog will compete for the deficiency of receptor sites, affecting the position of the equilibrium and the appearance of the spectrum. By using known amounts of ligand, the effect on the equilibrium can be readily determined, as seen by the change in the electron spin resonance spectrum. Once the standards have been calibrated, various devices can be employed which will provide a reading indicating directly the amount of the unknown material.

In carrying out the assay, three basic reagents are involved: the unknown or ligand; the free radical analog; and the receptor. The free radical analog and the receptor are conveniently prepared as reagent solutions, with additional reagents, as required, being in one or both of the solutions. Reagents may be transported either dry or in solution. Liquids are convenient for the transfer of small amounts of materials, since they are readily metered.

Polar solvents will normally be used, particularly hydroxylic solvents, such as water and aqueous alkanols of from 1 to 2 carbon atoms (methanol and ethanol). Other oxygenated solvents may also be employed, such as ethers, esters, dimethyl formamide, dimethyl sulfoxide, hexamethyl phosphoramide, etc., usually in combination with water in amounts of 0 to 40, more usually 1 to 30 volume percent.

In carrying out the assay, the dilution factor for each reagent will usually be 1.5 to 10 more usually 1.5 to 5. Therefore, the original concentration of the reagent in the reagent solution will to some extent anticipate the final concentration of the reagent in the assay.

The concentration of the receptor in the reagent solution will usually be in the range of $10^{-9}$ to $10^{-3}$ M, preferably $10^{-7}$ to $10^{-3}$ M, based on active sites. (The method of determination of active sites will be described in the experimental section.) Usually, this will roughly be about $10^{-4}$ to 100 mg./ml. more usually, about $10^{-2}$ to 10 mg./ml. For the assay, the concentration of receptor sites, should be about $10^{-3}$ to $10^{-9}$ M, more usually $10^{-4}$ to $10^{-8}$ M.

The molar concentration ranges for the ligand analog will parallel those of the receptor, both as to the reagent solution and as to the assay concentration. The ratio of ligand analog to receptor will usually be from 0.5 to 10, more usually 0.5 to 3 molecules per receptor site. The ratio will be governed by the binding constants, the method of determination, the suspected concentration of ligand and the specificity of the assay.

Usually, it will be desirable to have the assay mixture buffered, so as to have a mixture with a pH in the range of 5.0 to 10.5, preferably 7.0 to 8.5. In these circumstances, due to the dilution factor, one of the reagent solutions, preferably the receptor solution, will be buffered to provide a pH of 6.5 to 9.5, preferably 7.0 to 8.5. The concentration of buffer will vary with the buffer, usually in the reagent solution being about 0.05 to 0.8 M, more usually 0.2 to 0.7 M. The more acid the unknown solution, the higher the pH of the reagent solution which is used. In the assay mixture, the buffer concentration will usually be about 0.1 to 0.6 M.

The choice of buffer will vary widely, depending on its effect on the reagents e.g. solubility, inertness to the reagents, etc. Various buffers which are commonly used include tri(hydroxymethyl)methyl amine (tris); alkali metal and ammonium borates e.g. sodium borate; alkali metal and ammonium phosphate e.g. sodium and disodium phosphate; alkali metal bicarbonate and carbonate e.g. sodium bicarbonate and carbonate; ethylenediaminetetraacetic acid, amine diols in combination with their salts e.g. 2-amino-2-methyl-1,3-propandiol hydrochloride; ammonium chloride-ammonium hydroxide combination; barbital-alkali metal barbital combination; heterocyclic amines in combination with their salts e.g. collidine-hydrochloric acid, collidine-pyridine-acetic acid, ethanolamine-hydrochloric acid, N-ethylmorphine-pyridine-acetic acid, glycine-hydrochloric acid, piperazine-glycylglycine, etc. The preferred buffers are tris, bicarbonate-carbonate, phosphate and borate. With the inorganic buffers, it is frequently convenient to neutralize the inorganic acid, e.g. boric acid, with an alkali metal base e.g. sodium hydroxide, to the desired pH.

Other salts or reagents may also be present in the reagent solution, as required.

In some instances, pretreatment of the unknown substrate may be required. Where the unknown is suspected of containing a reductant e.g. ascorbic acid, which is capable of reducing the free radical, the unknown substrate may be treated with an oxidizing agent, such as sodium dichromate, sodium perborate, sodium periodate, iodine, etc. The choice of oxidizing agent will be governed by its effect on the other reagents which will be present in the assay. Alkali metal dichromate, particularly sodium dichromate and sodium hypoiodite, are oxidants of choice. The amount of oxidant will be governed by the suspected amount of reductant. With urine, concentrations of $10^{-1}$ to $10^{-3}$ M will usually suffice.

The order in which the reagents are brought together will be relatively arbitrary, governed to some degree on the interaction between the free radical ligand analog and the receptor. Therefore, the free radical ligand analog may be used bound to the receptor, and the unknown solution added. Or, the unknown solution and free radical ligand analog may be added simultaneously to compete for the sites on the receptor. In some instances, the ligand may first be bound to the receptor, and the ligand analog added. Any of these methods can be accurately calibrated and used for determination of a particular ligand. When convenient, the solution may be separated from the receptor, and the concentration of the free radical ligand analog in the solution determined. This can also be related to the unknown ligand concentration.

The solutions are mixed to provide reasonable homogeneity and if necessary transferred to an electron spin resonance sample holder. The holder is then introduced into an electron spin resonance spectrometer cavity. The temperature in the cavity is normally maintained in the range of about 15° C. to 40° C., and the change in the spectrum metered. Depending on the method of standardization and method of calibration, one or more points may have to be determined in order to determine the concentration of the unknown ligand.

Extremely small volumes are employed for the determination, usually in the range of 10 to 100 microliters for the total volume of reagents and unknown. The amount of unknown ligand that is required will normally be in the range of about $10^{-5}$ to $10^{-15}$ moles, more usually $10^{-7}$ to $10^{-13}$ moles.

A modification, which adds an additional procedural step, is to have the receptor bound to a support. This normally involves a heterogeneous system, rather than a homogeneous system. In many instances the advantageous use of the support in a heterogeneous system, more than offsets the additional effort involved in bonding the receptor to the support.

One way in which the support could be used is to pack a column (a column would probably be a small capillary tube) with the receptor bound to the support, and then bind ligand analog to the receptor. The amount of ligand analog present could be determined by measuring the electron spin resonance spectrum of the column, or preferably measuring the amount of ligand analog in solution before and after passage through the column. Now, relatively large amounts of the unknown fluid could be passed through the column, followed by determining the spectrum of the column or of the effluent. The change in spectrum would be proportional to the amount of ligand in the fluid passed through the column. (Also the rate of flow if equilibrium is not established.)

Alternatively, one could mix ligand and ligand analog, with the receptor bound to the support in a tube. After equilibrium was established, by separating the receptor bound to the support from the supernatant liquid, one could measure the electron spin resonance of either or both, the support or the supernatant liquid. A further variation, would be to determine the remaining ligand analog bound to the support by addition of ligand to the support, so as to release any remaining ligand analog and to analyze for the ligand analog in solution.

In addition, supports will find particular use, when a large molecule, usually in excess of 5000 molecular weight, and more usually in excess of 10,000 molecular weight, is the ligand to be assayed. It is found, that when the free radical compound is bonded to a large molecule, significantly in excess of 5,000 molecular weight, the spin approximates that of an immobilized spin in solution. Therefore, further binding to a receptor, does not significantly change the spin of the free radical. It is thus appropriate to bind the receptor to the support, carry out the assay by adding ligand analog and ligand to the support and then determining the amount of ligand analog in a solution and/or on the support. In this instance, one is not determining the change in electron spin resonance spectrum due to change of immobilized spin to mobilized spin, but rather the absolute number of free radical groups which are present.

REAGENTS

Ligand—Free radical ligand analog

Ligands which may be assayed are limited primarily by the ability to provide a receptor site with the desired specificity. Where the interaction with the ligand and free radical ligand analog is reversible, either displacement of the free radical ligand analog from the receptor site by the ligand or competition for the receptor site by the free radical ligand analog and ligand may be used. Where the receptor site reacts with the ligand and/or free radical ligand analog in an irreversible way, then only the competitive method may be employed.

Ligands presently contemplated for analysis by the present technique may be further classified as hormones, drugs, vitamins, organic chemical toxic agents which are deleterious to the environment such as agricultural pesticides and household poisons and detergents, and human metabolic products that are important in the diagnosis of disease states.

For the most part, the ligands will be biologically active molecules which have as least 1 polar site, more usually at least 2 polar sites and at least 6 carbon atoms, normally having molecular weights of at least about 125. The molecular weights will usually not exceed 70,000 more usually not exceed 10,000 and more commonly not exceed 5,000. As indicated earlier, with ligands above 5,000 in molecular weight, a particular technique will be employed. Usually, the ratio of carbon atoms to heteroatoms will be equal to or greater than 1:1, more usually greater than 2:1, and preferably greater than 4:1, but not exceeding 30:1. The various molecules which serve as ligands and are of diagnostic interest can be broken down into different categories.

Alkaloids

The first category is the alkaloids. Included in the category of alkaloids, for the purpose of this invention, are those compounds which are synthetically prepared to physiologically simulate the naturally occurring alkaloids. All of the naturally occurring alkaloids have an amine nitrogen as a heteroannular member. The synthetic alkaloids will normally have a tertiary amine, which may or may not be a heteroannular member. The alkaloids have a variety of functionalities present on the molecule, such as ethers, hydroxyls, esters, acetals, amines, isoxazole, olefins, all of which, depending on their particular position in the molecule, can be used as sites for bonding to the free radical functionality.

A particularly preferred group of alkaloids are the morphine alkaloids and their physiologically mimetic synthetic analogs. All of these molecules have the following functionality and minimum structure:

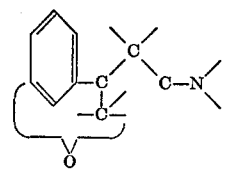

wherein the free valences are satisfied by a wide variety of groups, primarily carbon and hydrogen.

The free radical analog of these compounds will for the most part have the following minimum skeletal structure:

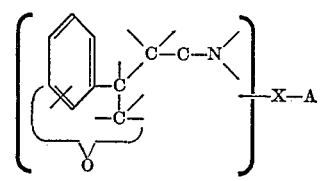

wherein X is a bond or a functionality such as imino, azo, oxy, thio, sulfonyl, oxocarbonyl, nonoxocarbonyl, or combinations thereof. Oxygen will be in the ortho, meta or $\beta$ position. A is a heterocyclic compound of from 5 to 6 annular members, one of which annular member is a nitrogen of a nitroxide functionality, the other heteroannular member may be oxygen, sulfur or nitrogen. The nitrogen and sulfur may or may not be bonded to an oxygen atom. The ring will have from 0 to 1 site of ethylenic unsaturation. The various free radical groups will be discussed subsequently.

The molecular weight of the compounds having the free radical substituent will be at least about 350 and normally not exceeding 700, more usually in the range from about 400 to 600.

The free radical labeled morphine and its closely related analogs will have the following formula:

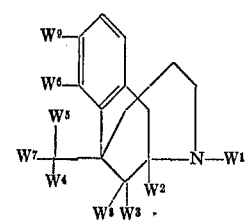

wherein:

any one of the W groups can be —X*—A* or a H of any of the W groups may be replaced by —X*—A*. X*—A* will be defined subsequently (there is only one —X*—A* per molecule);

$W^1$—hydrogen or hydrocarbon of from one to eight carbon atoms, particularly alkyl and aralkyl, e.g. methyl and β-phenethyl;

$W^2$—hydrogen;

$W^3$—hydrogen;

$W^4$—hydrogen or taken together with $W^3$ a divalent radical of from 3 to 6 carbon atoms and 0 to 2 oxygen atoms, forming a six member carbocyclic ring with the carbon chain to which they are attached, e.g. propylene-1,3, 1-hydroxyprop-2-enylene-1,3, 1-hydroxypropylene-1,3, 1-acetoxypropylene-1,3, 1-acetoxyprop-2-enylene-1,3, 1-oxopropylene-1,3, 1-oxoprop-2-enylene-1,3;

$W^5$—hydrogen or hydroxyl;

$W^6$—hydrogen, hydroxyl or taken together with $W^5$ oxy (—O—);

$W^7$—hydrogen or methyl;

$W^8$—hydrogen of hydroxyl; and $W^9$ is hydrogen, hydroxy, acyloxy of from 1 to 3 carbon atoms, e.g. acetoxy (acyloxy intends only carboxy), hydrocarbyloxy of from 1 to 3 carbon atoms, e.g. methoxy, ethoxy, 2-(N-morpholino)ethyl, and glucuronyl. (It is understood, that in all the formulas, except when a minimum or skeletal structure is indicated, unsatisfied valences are satisfied by hydrogen.)

(Hydrocarbyl is an organic radical compound solely of hydrogen and carbon and may be saturated or unsaturated, aliphatic, alicyclic, aromatic or combinations thereof.)

Illustrative compounds which can be substituted with free radical groups include morphine, heroin, hydromorphone, oxymorphone, metopon, codeine, hydrocadone, dihydrocodeine, dihydrohydroxycodienone, pholcodine, dextromethorphan, phenazocine and dionin.

Preferred compounds have $W^1$, or $W^9$ as —X*—A* or have $W^3$ and $W^4$ taken together to provide A*—X*—CHCH$_2$CH$_2$— or A*—X*—CH—CH=CH—.

It is to be understood that the various groups are chosen so as to relate to known compounds of physiological interest. The primary difference between the known compounds and the subject compounds is the linking group and the presence of the free radical spin label.

Another group of compounds having narcotic activity is methadone and its analogs, which for the most part have the following formula:

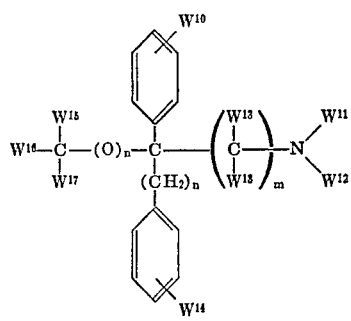

wherein:

any one of the W groups can be —X*—A* or a H of any of the W groups may be replaced by —X*—A*. X*—A* will be defined subsequently (there is only one —X*—A* per molecule);

$n$ is 0 or 1, usually being the same in both instances;

$m$ is 2 or 3;

$W^{10}$ is hydrogen;

$W^{11}$ and $W^{12}$ are hydrogen, alkyl of from 1 to 3 carbon atoms, e.g. methyl, or may be taken together to form a six membered ring with the nitrogen atom to which they are attached, e.g. pentylene-1,5 and 3-oxapentylene-1,5;

$W^{13}$ is hydrogen or methyl, only one $W^{13}$ being methyl;

$W^{14}$ is hydrogen;

$W^{15}$ is hydrogen or hydroxyl;

$W^{16}$ is hydrogen, acyloxy of 1 to 3 carbon atoms, e.g. propionoxy, or hydroxy (when $W^{15}$ and $W^{16}$ are both hydroxy, the oxo group is intended); and $W^{17}$ is hydrogen or alkyl of 1 to 3 carbon atoms, e.g. ethyl.

Illustrative compounds which can be marked with a free radical are methadone, dextromoramide, dipipanone, phenadoxone, propoxyphene (Darvon) and acetylmethadone.

Preferred compounds are when $W^{11}$ or $W^{16}$ is

—X*—A*

The third group of compounds which have narcotic activity and are meperidine or meperidine analogs, have for the most part, the following formula:

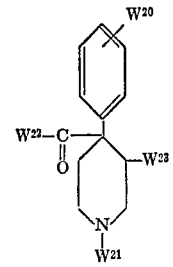

wherein:

any one of the W groups can be —X*—A* or an H any of the W groups may be replaced by —X*—A*. X*—A* will be defined subsequently (there is only one —X*—A* per molecule);

$W^{20}$ is hydrogen;

$W^{21}$ is hydrogen, alkyl of from 1 to 3 carbon atoms, e.g. methyl, aminophenylalkyl, e.g. β-(p-aminophenyl)ethyl, phenylaminoalkyl, e.g. phenylaminopropyl (alkyl of from 2 to 3 carbon atoms);

$W^{22}$ is alkoxy of from 1 to 3 carbon atoms, e.g., ethoxy;

$W^{23}$ is hydrogen or methyl.

Illustrative compounds are meperidine, alphaprodine, alvodine and anileridine.

Preferred compounds are those where $W^{21}$ or $W^{22}$ is —X*—A* or a hydrogen of $W^{21}$ is replaced with

—X*—A*

A second group of ligands of interest are based on tryptamine and come within the class of indole alkaloids, more specifically ergot alkaloids. These compounds will have the following minimal structure:

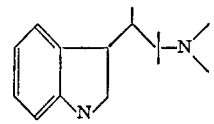

wherein the free valences are satisfied by a variety of groups, primarily carbon and hydrogen, although other substituents may be present such as carboxyl groups, hydroxyl groups, keto groups, etc. The most common member of this class which finds use is lysergic acid, primarily as its diethylamide. Other members of the indole alkaloid family which can also be assayed for are the strychnine group and the indolopyridocoline group, which finds yohimbine and reserpine as members.

The free radical substituted indole alkaloids will have the following formula:

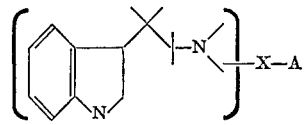

wherein X and A have been defined previously.

Other groups of alkaloids include the steroid alkaloids, the iminazolyl alkaloids, the quinazoline alkaloids, the isoquinoline alkaloids, the quinoline alkaloids, quinine being the most common, and the diterpene alkaloids.

For the most part, the alkaloids bonded to a free radical functionality will be of from about 300 to 1500 molecular weight, more usually of from about 400 to 1000 molecular weight. They are normally solely composed of carbon, hydrogen, oxygen, nitrogen and sulfur, sulfur being present in the free radical groups: the oxygen is present as oxy and oxo and the nitrogen present as amino or amido. Of course, with the nitroxide radical, a nitrogen and oxygen will be present together as that functionality.

Of significant importance are drugs which while having a beneficient and proper medical use, have found distribution outside of medical use and have been abused. Illustrative groups within this category are amphetamines, barbiturates and other drugs that find use in providing emotional stimuli.

Catecholamines

The first group are catecholamines of the formula:

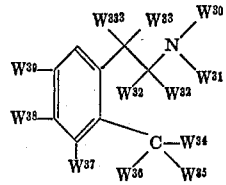

wherein:

any one of the W groups can be —X*—A* or a H of any of the W groups may be replaced by —X*—A*. X*—A* will be defined subsequently (there is only one —X*—A* per molecule);

$W^{30}$ is hydrogen or alkyl of from 1 to 3 carbon atoms, e.g. methyl;

$W^{31}$ is hydrogen, or alkyl of from 1 to 3 carbon atoms, e.g. methyl;

$W^{32}$ and $W^{33}$ are hydrogen;

$W^{34}$ is hydrogen, hydroxy, dimethoxycarboxyphenacyl, and dimethoxy-α-phthalidyl;

$W^{35}$ and $W^{36}$ are hydrogen, one of which may be taken with $W^{31}$ to form a bond, and when $W^{31}$ and $W^{35}$ are taken together, each of $W^{32}$ and $W^{33}$, and $W^{30}$ and $W^{36}$, may be taken together to form a double bond;

$W^{37}$ is hydrogen or alkoxy of from 1 to 3 carbon atoms, e.g. methoxy;

$W^{38}$ and $W^{39}$ are hydroxy or alkoxy of from 1 to 3 carbon atoms, e.g. methoxy.

Illustrative compounds include cotainine, narceine, noscapine and papaverine.

Preferred compounds are where $W^{30}$, $W^{38}$ or $W^{39}$ are —X*—A* or have a hydrogen replaced with —X*—A*.

Another group of catecholamines are amphetamines and related compounds. These compounds have the formula:

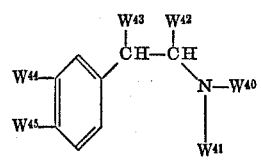

wherein:

any one of the W groups can be —X*—A* or a H of any of the W groups may be replaced by —X*—A*. X*—A* will be defined subsequently (there is only one —X*—A* per molecule);

$W^{40}$ and $W^{41}$ are hydrogen or alkyl of from 1 to 3 carbon atoms, e.g. methyl and isopropyl, preferably one is hydrogen;

$W^{42}$ is hydrogen, alkyl of from 1 to 3 carbon atoms, e.g., methyl and ethyl, and carboxy;

$W^{43}$ is hydrogen or hydroxyl; and $W^{44}$ and $W^{45}$ are hydrogen, hydroxyl or alkoxyl of from 1 to 3 carbon atoms.

Illustrative compounds which can be spin labeled are ephedrine, epinephrine, L-dopa, cohefrine, benzidrine (amphetamine), paredrine, methamphetamine and norephedrine.

Barbiturates

A wide class of synthetic drugs which finds extensive and frequent abuse are the barbiturates. These compounds are synthetically readily accessible and their use only difficulty policed. The compounds which find use will come within the following formula:

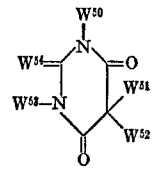

wherein:

any one of the W groups can be —X*—A* or a H of any of the W groups may be replaced by —X*—A*. X*—A* will be defined subsequently (there is only one —X*—A* per molecule);

$W^{50}$ is hydrogen, alkyl of from 1 to 3 carbon atoms, e.g. methyl or alkali metal, e.g. sodium;

$W^{51}$ and $W^{52}$ are hydrogen, alkyl, alkenyl, cycloalkyl, cycloalkenyl, or aryl hydrocarbon of from 1 to 8, more usually 1 to 6 carbon atoms, e.g. ethyl, n-butyl, α-methylbutyl, isoamyl, allyl, Δ¹-cyclohexenyl, and phenyl;

$W^{53}$ is hydrogen or alkali metal, e.g. sodium;

$W^{54}$ is oxygen or sulfur.

Illustrative compounds which may be spin labeled are veronal, medinal, luminal, prominal, soneryl, nembutal, amytal, dial, phenadorn, seconal, evipan, phenobarbital and pentothal.

Preferred compounds would have $W^{50}$ or $W^{51}$ or a hydrogen of $W^{50}$ or $W^{51}$ as —X*—A*.

Cocaine

A drug of significant importance in its amount of use is cocaine. The free radical labeled cocaine or cocaine metabolites or analogs, such as ecgonine, will for the most part have the following formula:

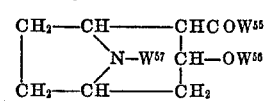

wherein:

any one of the W groups can be —X*—A* or an H of any of the W groups may be replaced by —X*—A*. X*—A* will be defined subsequently (there is only one —X*—A* per molecule);

$W^{55}$ is hydroxy, methoxy and amino;

$W^{56}$ is hydrogen or benzoyl; and $W^{57}$ is hydrogen or alkyl of from 1 to 3 carbon atoms, e.g. methyl.

Amino acids and polypeptides

The next group of compounds are the amino acids and polypeptides. For the most part, the amino acids range in carbon content from 2 to 14 carbon atoms, and include a variety of functional groups such as mercapto, dithio, hydroxyl, guanidyl, pyrrolidine, indole, imidazole, methylthioether, iodo, diphenylether, phenol, etc. These of course, are primarily the amino acids related to humans, there being other amino acids found in plants and animals.

The polypeptides will normally have from 2 to about 700, more usually from about 2 to 100 recurring amino acid groups. Any of the aforementioned amino acids may be used in preparing the polypeptide. Because of the wide variety of functional groups which are present in the amino acids and are frequently present in the various naturally occurring polypeptides, the free radical group can be bonded to any convenient functionality, by having the appropriate functionality on the free radical compound. Usually, the free radical functionality can be bonded to a lysine or arginine group, although serine, threonine or any other amino acid with a convenient functionality may be used, e.g. carboxy and hydroxy.

For the most part, the free radical labeled polypeptides will have the following formula:

$$\left( H_2N - \left( \begin{array}{c} CHCO - NH \\ | \\ R \end{array} \right)_n \begin{array}{c} CHCO_2H \\ | \\ R \end{array} \right) - X - A$$

wherein X and A have been defined previously and R is an amino acid residue, $n$ being an integer of from 1 to 700, more usually of from 1 to 200, and most commonly of from 2 to 100.

Illustrative amino acids include glycine, alanine, serine, histidine, methionine, hydroxyproline, tryptophan, tyrosine, thyroxine, ornithine, phenylalanine, arginine, and lysine. Polypeptides of interest are ACTH, oxytocin, luteinizing hormone, insulin, Bence-Jones protein, chorionic gonadotropin, pituitary gonadotropin, growth hormone, renin, thyroxide bonding globulin, bradykinin, angiotensin, etc.

Steroids

Another important group of compounds which find use in this invention are the steroids, which have a wide range of functionalities depending on their function in the body. In addition to the steroids, are the steroidmimetic substances, while not having the basic polycyclic structure of the steroid, do provide some of the same physiological effects.

For the most part, the steroids used have the following structure:

[structure with Z and X—A substituents]

wherein X and A have been defined previously. Usually, the free radical label will be bonded to the A or B rings, at the 2, 3 or 6 positions, or at the 17 position of the D ring or on the side chains at the 17 position. The rings may have various substituents, particularly methyl groups, hydroxyl groups, oxocarbonyl groups, ether groups, and amino groups. Any of these groups may be used to bond the free radical functionality to the basic ring structure. For the most part, the steroids of interest will have at least one, usually 1 to 4 oxygen functionalities, e.g. alcohol, ether, esters, or keto. The steroids will usually have from 18 to 27 carbon atoms.

The rings may have one or more sites of unsaturation, either ethylenic or aromatic and may be substituted at other positions such as the 6, 7 and 11 positions with oxygen substituents. In addition, there may be methyl groups at the 10 and 13 positions. The position marked with a Z, 17, may be and will be varied widely depending on the particular steroid. Z may be a carbonyl oxygen, an aliphatic group of from 1 to 8 carbon atoms, including an acetyl group, a hydroxyacetyl group, a hydroxy group carboxy or carboxyalkyl of from 2 to 6 carbon atoms, an acetylenic group of from 2 to 6 carbon atoms or halosubstituted alkyl or oxygenated alkyl groups, or a group having more than one functionality, usually from 1 to 3 functionalities.

These steroids find use as hormones, male and female (sex) hormones which may be divided into oestrogens, gestogens and androgens, adrenocortical hormones (glucocorticoids), bile acids, cardiotonic glycosides and agylcones, as well as saponins and sapogenins.

Steroid mimetic substances, particularly sex hormones are illustrated by diethyl stilbestrol.

The sex hormones of interest may be divided into two groups: the male hormones (androgens) and the female hormones (estrogens).

The androgens which find use will have the following formula:

[steroid structure with $W^{60}$, $W^{61}$, $W^{62}$, $W^{63}$ substituents]

0-1 site of ethylenic unsaturation wherein:

any one of the W groups can be —X*—A* or a H of any of the W groups may be replaced by —X*—A*. X*—A* will be defined subsequently (there is only one —X*—A* per molecule);

$W^{60}$ is hydrogen or hydroxyl;

$W^{51}$ and $W^{52}$ are hydrogen, alkyl, alkenyl, cycloalkyl, cy- bonded to the same carbon atom are hydroxyl, oxo is intended);

$W^{62}$ and $W^{63}$ are hydrogen or hydroxyl, at least one of $W^{60-63}$ is hydroxyl (either as hydroxy or oxo).

Illustrative compounds which maye be spin labeled include testosterone, androsterone, isoandrosterone, etiocholanolone, methyltestosterone and dehydroisoandrosterone.

The estrogens have an aromatic A ring and for the most part have the following formula:

[steroid structure with $W^{70}$, $W^{71}$, $W^{72}$, $W^{73}$ substituents]

0 or 2 sites of ethylenic unsaturation wherein:

any one of the W groups can be —X*—A* or a H of any of the W groups may be replaced by —X*—A*. *X—A* will be defined subsequently (there is only one —X*—A* per molecule);

$W^{70}$ is hydrogen or hydroxyl;

$W^{71}$ is hydrogen, ethinyl or hydroxyl (when two hydroxyls are bonded to the same carbon atom, oxo is intended);

$W^{72}$ is hydrogen or hydroxyl; and $W^{73}$ is hydroxyl or alkoxyl of from 1 to 3 carbon atoms.

Illustrative compounds which may be spin labeled are equilenin, β-estradiol, estrone, estriol and 17-α-ethinyl-estradiol.

Another class of hormones are the gestogens which have the following formula:

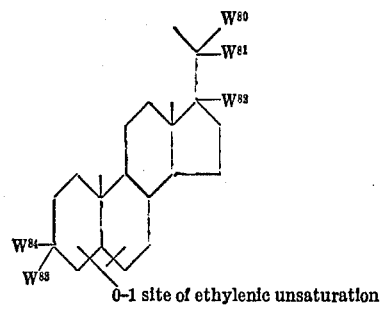

0–1 site of ethylenic unsaturation wherein:

any one of the W groups can be —X*—A* or a H of any of the W groups may be replaced by —X*—A*. —X*—A* will be defined subsequently (there is only one —X*—A* per molecule);

$W^{80}$ and $W^{81}$ are hydrogen or hydroxyl, at least one being hydroxyl (where two hydroxyl groups are bonded to the same cabon atom, oxo is intended);

$W^{82}$ is hydrogen or hydroxyl;

$W^{83}$ and $W^{84}$ are hydrogen or hydroxyl, at least one being hydroxyl.

Illustrative compounds which may be spin labeled include progesterone, pregnenolone, allopregnane-3a:20a-diol and allopregnane-3a-ol-20-one.

The next important groups of steroids are the corticosteroids which include both the mineralocorticoids and the glucocorticoids. These compounds have the following formula:

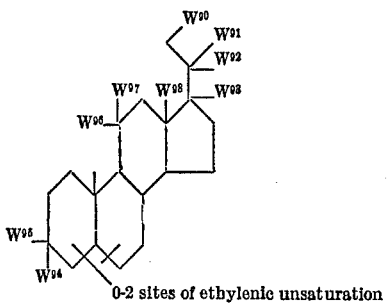

0–2 sites of ethylenic unsaturation wherein:

any one of the W groups can be —X*—A* or a H of any of the W groups may be replaced by —X*—A*. X*—A* will be defined subsequently (there is only one —X*—A* per molecule);

$W^{90}$ is hydrogen or hydroxyl;

$W^{91}$ and $W^{92}$ are hydrogen or hydroxyl, at least one of which is hydroxyl (when two hydroxyl groups are bonded to the same carbon atom, oxo is intended);

$W^{93}$ is hydrogen or hydroxyl;

$W^{94}$, $W^{95}$, $W^{96}$, and $W^{97}$ is hydrogen or hydroxyl, at least one of $W^{94}$ and $W^{95}$ is hydroxyl; and $W^{98}$ is methyl or formyl.

Illustrative compounds which may be spin labeled are 17-hydroxydioxycorticosterone (Compound S), deoxycorticosterone, cortisone, corticosterone, 11-dihydrocortisone (Compound F), cortisol, prednisolone and aldosterone.

An additional steriod family is the sapogenins of which digitalis is an important member. The basic compound is gitoxigenin, which is also found as the glycoside. The compounds of interest have the following formula:

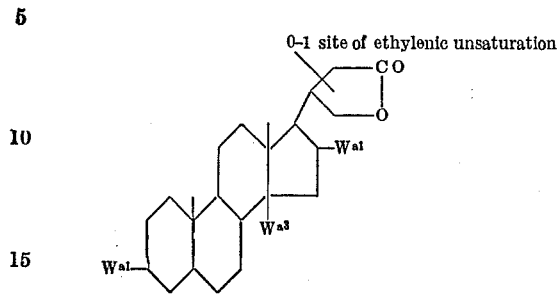

wherein:

any one of the W groups can be —X*—A* or a H of any of the W groups may be replaced by —X*—A*. A*—A* will be defined subsequently (there is only one —X*—A* per molecule);

$W^{a1}$, $W^{a2}$ and $W^{a3}$ are hydrogen or hydroxy, usually hydroxyl.

Marijuana

While not a group of compounds, because of its ready availability and widespread use, tetrahydrocannabinol (the active ingredient of marijuana) is a compound of great interest, where a simple assay method would be of importance. The compounds which find use as analogs have the following formula:

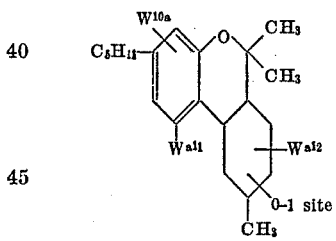

0–1 site of ethylenic unsaturation wherein:

any one of the W groups can be —X*—A* or a H of any of the W groups may be replaced by —X*—A*. A*—A* will be defined subsequently (there is only one —X*—A* per molecule);

$W^{a10}$ and $W^{a12}$ are hydrogen; and $W^{a11}$ is hydroxyl.

Vitamins

The next group of compounds are the vitamins. Chemically, the vitamins do not provide a simple chemical class, varying greatly in structure, but being classified as a group as to function. The vitamins include, vitamin A, which is a carotene, the B vitamin group which includes riboflavin, thiamine, niacin, pyridoxine, pantothenic acid, biotin, folic acid, and cyanocobalamine (vitamin $B_{12}$); ascorbic acid (vitamin C); the D vitamins which are steroidal derived; tocopherol (vitamin E); and phytyl-1,4-naphthoquinone (vitamin K).

Sugars

The next group of compounds are the sugars and saccharides. The saccharides are combinations of various sugars to form dimers, trimers and high molecular weight polymers, referred to as polysaccharides.

Prostaglandin

Another group of compounds of biological importance are the prostaglandins. These compounds when labeled have for the most part the following formula:

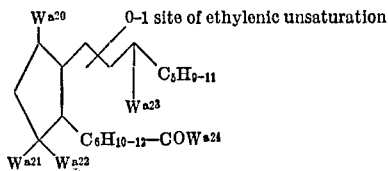

wherein:

any one of the W groups can be —X*—A* or a H of any of the W groups may be replaced by —X*—A*. X*—A* will be defined subsequently (there is only one —X*—A* per molecule);

$W^{a20}$ is hydrogen or hydroxyl;

$W^{a21}$ and $W^{a22}$ are hydrogen or hydroxyl (where two hydroxyl groups are bonded to the same carbon atom, oxo is intended);

$W^{a23}$ is hydrogen or hydroxyl; and $W^{a24}$ is hydroxyl, amino or an oxy group of from 1 to 6 carbon atoms, e.g. alkoxy.

Tranquilizers

A number of compounds have tranquilizer effects and because of their misuse or abuse do provide opportunities where the determination could be of use.

The first tranquilizer of interest is Meprobamate, also known as Miltown or Equanil. This compound and related analogs have the following formula:

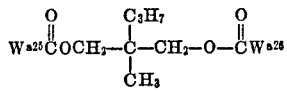

wherein:

any one of the W groups can be —X*—A* or an H of any of the W groups can be replaced by —X*—A*. X*—A* will be defined subsequently (there is only one —X*—A* per molecule);

$W^{a25}$ and $W^{a26}$ are amino.

The next group of tranquilizers are benzdiazocycloheptanes and are known as Librium, Valium, Diazepam, or Oxazepam. These compounds and their related analogs will have the following formula:

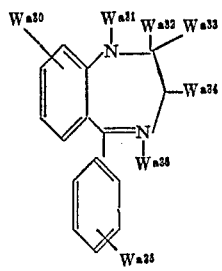

wherein:

any one of the W groups can be —X*—A* of an H of any one of the W groups may be replaced by —X*—A*. X*—A* will be defined subsequently (there is only one —X*—A* per molecule);

$W^{a30}$ and $W^{a35}$ are hydrogen; $W^{a31}$ is hydrogen, lower alkyl of from 1 to 3 carbon atoms, e.g. methyl, or may be taken together with $W^{a32}$ to form a double bond between the carbon and the nitrogen;

$W^{a33}$ is amino or lower alkylamino of from 1 to 3 carbon atoms, e.g. methylamino, or may be taken together with $W^{a32}$ to form a carbonyl;

$W^{a34}$ is hydrogen or hydroxyl; and $W^{a36}$ is oxy or an unshared pair of electrons.

The next group of compounds are the phenothiazines of which chlorpromazine is a member. These compounds will for the most part have the following formula:

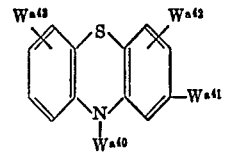

wherein:

$W^{a40}$ is hydrogen, alkyl of from 1 to 6 carbon atoms, dialkylaminoalkyl of from 4 to 8 carbon atoms, e.g. 3-(dimethylamino)propyl; N-hydroxyalkyl (alkyl of from 2 to 3 carbon atoms), N'-piperazinoalkyl (alkyl of from 2 to 3 carbon atoms), e.g. N-hydroxyethyl N'-piperazinopropyl; N-alkyl (alkyl of from 1 to 3 carbon atoms), N'-piperazinoalkyl (alkyl of from 2 to 3 carbon atoms), e.g. N-methyl N'-piperazinopropyl; and 2-(N-alkyl)piperidinylalkyl, wherein the N-alkyl is of from 1 to 3 carbon atoms and the other alkyl is of from 2 to 3 carbon atoms, e.g. 2-(N-methyl)-piperidinylethyl, there being at least two carbon atoms between the heteroatoms;

$W^{a41}$ is hydrogen, chloro, trifluoromethyl, alkylmercapto of from 1 to 3 carbon atoms, e.g. methylmercapto and acyl of from 1 to 3 carbon atoms, e.g. acetyl; and $W^{a42}$ and $W^{a43}$ are hydrogen.

Miscellaneous

The final group is a miscellaneous group which includes a variety of drugs or other chemicals, which find use in medical, veterinary, or other applications.

Included in this group are the antibiotics such as penicillin, chloromycetin, actinomycetin and nucleic acids or derivatives such as nucleosides, and nucleotides.

Also of interest is serotonin which is 3-(2'-aminoethyl)-5-hydroxyindole. —X*—A* may be bonded at either of the amino nitrogen atoms or the hydroxyl group.

Two compounds of interest which are metabolites of epinephrine are vanillylmandelic acid and homovanillic acid. With these compounds, either the hydroxyl or carboxyl groups can be used as the site for —X*—A*.

Another compound of interest is glutethimide, wherein the free radical analog will have the following formula:

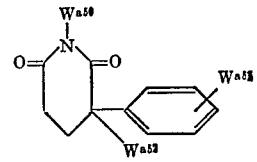

wherein:

any one of the W groups can be —X*—A* or an H of any one of the W groups may be replaced by —X*—A*. X*—A* will be defined subsequently (there is only one —X*—A* per molecule);

$W^{a50}$ and $W^{a51}$ are hydrogen; and $W^{a52}$ is lower alkyl of from 1 to 3 carbon atoms, e.g. ethyl.

Another general category of interest is the pesticides, e.g. insecticides, fungicides, bacteriocides and nematocides. Illustrative compounds include phosphates such as malathion, DDVP, dibrom; carbamates, such as Sevin, etc.

Since many of the biologically active materials are active in only one stereoisomeric form, it is understood that the active form is intended or the racemate, where the racemate is satisfactory and readily available. The antibodies will be specific for whatever form is used as the hapten.

Free radical group (A)

The free radical group is a stable free radical, preferably one which has a fairly simple electron spin resonance spectrum, which can be conveniently bonded through a linking group to the ligand. Various stable free radicals may be used, such as verdazyls, diarylamino radicals, aroxyl radicals, and nitroxide radicals. See Forrester, Organic Chemistry of Stable Free Radicals, Academic Press, New York (1968).

In the subject invention, the most versatile compounds are the nitroxide radical compounds, wherein the nitrogen of the nitroxide group is a heteroannular member. These compounds may be mono- or bicyclic, fused or unfused, and will normally be of from 7 to 36 carbon atoms, more usually of from 7 to 16 carbon atoms, wherein the annular members will normally be of from 5 to 9. The compounds may have from 0 to 2 other heteroannular members more usually from 0 to 1, which are oxygen, nitrogen or sulfur. The nitrogen and sulfur may be bonded to oxygen, nitrogen to one oxygen atom, and sulfur to from 0 to 2 oxygen atoms. More usually 0 or 2. The compounds will normally have from 0 to 1 site of endo ethylenic unsaturation.

A special group of nitroxide compounds are the mono-, aryl and diaryl nitroxides, where the ortho and para positions are substituted, usually with alkoxy groups, in order to inhibit reaction between the two nitroxide compounds. In the monoaryl nitroxide compound, the other valence of the nitrogen will be bonded to a tertiary carbon atom.

The nitroxide compounds which find use in this invention will have the following formula:

wherein: Z and Z' are organic radicals, which are incapable of forming a double bond to nitrogen without a substantial change in structure and are either aryl, normally trialkoxyaryl, tertiary alkyl, or may be taken together with the nitrogen to which they are attached to form a mono- or bicyclic ring of from 5 to 9 annular members.

For the most part, the compounds which will be employed will have the following formula:

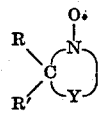

wherein: R and R' are hydrocarbon groups of from 1 to 12 carbon atoms, more usually from 1 to 6 carbon atoms, and preferably alkyl of from 1 to 3 carbon atoms; and Y is a divalent functionality of from 3 to 27 atoms other than hydrogen, more usually from 3 to 12 atoms other than hydrogen, having a total of from 0 to 2 heteroatoms; oxygen, nitrogen or sulfur, which are annular members; Y forms a ring of from 5 to 6 annular members with the carbon and nitrogen atoms to which it is attached. One of the hydrogen atoms bonded to carbon, usually an annular carbon atom, will be replaced so as to provide a site for linking to the ligand.

Y will be bonded to the nitrogen of the nitroxide through carbon, the carbon atom being free of hydrogen or being sterically prevented from forming a double bond to nitrogen e.g. by an endo double bond.

One preferred group of free radical compounds has the following formula:

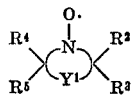

wherein $R^{2-5}$ are the same or different, preferably the same, and are hydrocarbon of from 1 to 12 carbon atoms, more usually from 1 to 6 carbon atoms, preferably alkyl and particularly preferred methyl; $Y^1$ is a divalent radical having from 2 to 10 carbon atoms, more usually 2 to 4 carbon atoms and from 0 to 1 heteroatoms, there being from 2 to 3 annular members, usually carbon; $Y^1$ may have from 0 to 1 site of ethylenic unsaturation and preferably will form a pyrroline, pyrrolidine, or piperidine ring. The heteroatoms will normally be nitrogen, oxygen and sulfur.

A subgenus of the monocyclic nitroxide is the five membered ring having one annular heteroatom of the following formula:

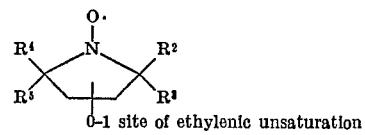

0-1 site of ethylenic unsaturation with $R^{2-5}$ defined as above.

Another subgenus is the six membered ring compounds which have the following formula:

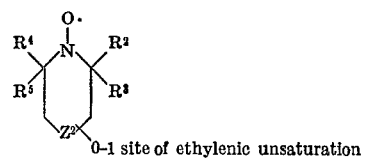

0-1 site of ethylenic unsaturation wherein $R^{2-5}$ are as defined above, and $Z^2$ is carbon or nitrogen.

The five membered rings having two annular heteroatoms will for the most part have the following formula:

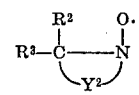

wherein $Y^2$ is $$-(R^4)(R^5)C-N^+=C-R^6$$
$$\quad\quad\quad\quad\quad\quad\quad |$$
$$\quad\quad\quad\quad\quad\quad\quad O-$$
$$-(R^6)(R^7)C-O-C(R^4)(R^5)-$$
$$-(R^4)(R^5)C-N=C-R^6-CONH-C(R^4)(R^5)-$$

wherein $R^{2-5}$ are as defined above, $R^6$ and $R^7$ may be the same as $R^{2-5}$ or hydrogen.

A preferred nitroxide free radical containing group of compounds has the following formula:

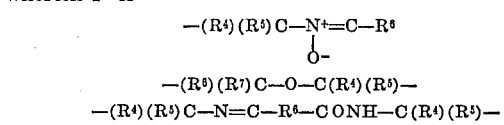

wherein $q$ is 0 or 1, preferably 1, when $q$ is 1 the nitrogen to which the oxygen is bonded is positive, $R^{2-5}$ have been defined previously, and $R^6$ is as defined above.

Illustrative rings include 1-oxylpiperidine, 1-oxylpyrrolidine, 1-oxylpyrroline, 1-oxylimidazolidine, 1-oxyl-3-oxyimidazolidine, 1-oxyltetrahydropyridine and 3-oxyloxazolidine.

The bridgehead nitroxide compounds will for the most part have the following formula:

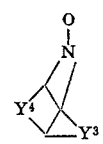

wherein: $Y^3$ and $Y^4$ are divalent aliphatic hydrocarbon radicals having from 0 to 1 site of ethylenic unsaturation and of from 2 to 3 carbon atoms.

The last nitroxide to be specifically considered is the aryl nitroxide which will have the following formula:

wherein: $Z^3$ is 2,4,6-trialkoxy benzene, wherein the alkoxy groups are of from 1 to 3 carbon atoms and $Z^4$ is the same as $Z^3$ or tertiary alkyl of from 4 to 12 carbon atoms, more usually of from 4 to 6 carbon atoms.

The verdazyls will for the most part have the following formula:

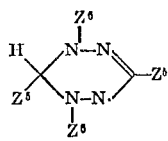

wherein $Z^5$ is hydrocarbon or a acyloxy of from 1 to 8 carbon atoms and $Z^6$ is aryl or substituted aryl e.g. hydroxy or amino of from 6 to 10 carbon atoms.

As already indicated, the free radical group is bonded to the ligand through a bond or linking group which is substituted on the free radical group by replacing one of the hydrogen atoms. In addition, sharper spectra can be obtained by replacing hydrogen atoms with deuterium atoms. It is, therefore, to be understood when hydrogen is spoken of in referring to the free radical group, that deuterium is to be treated as an equivalent.

In carrying out the subject invention, particularly where the ligand does not have a naturally occurring receptor or it is found to be more convenient to prepare antibodies, the ligand will be modified by providing a group which can be bonded to a protein. Therefore, some reactive functionality will be introduced into the ligand, either by activating a functionality which is present, e.g. by transforming a carboxylic acid to a mixed anhydride, or by introducing a new functionality, e.g. modifying a hydroxy group with a carboxymethyl group. Since the antibodies which are formed will recognize the ligand with its attached linking group, that was employed in preparing the antigenic material, normally the same ligand with its attached linking group used to prepare the antigenic material will also be used to bond to the free radical group. Therefore, most commonly, the substituents on the free radical group will be the relatively simple substituents such as amino, hydroxy and carboxy.

Illustrative compounds which will be used for linking to the ligand are 1-oxyl-3-amino-2,2,5,5-tetramethylpyrrolidine,
1-oxyl-3-hydroxy-2,2,5,5-tetramethylpyrrolidine,
1-oxyl-3-carboxy-2,2,5,5-tetramethylpyrrolidine,
1-oxyl-3-carboxy-2,2,5,5-tetramethylpyrroline,
1-oxyl-4-amino-2,2,6,6-tetramethylpiperidine,
1-oxyl-4-hydroxy2,2,6,6-tetramethylpiperidine,
1-oxyl-4-carboxy-2,2,6,6-tetramethyltetrahydropyridine,
2-methylamino-1,3-dioxy-4,4,5,5-tetramethylimidazoline,
2-hydroxymethyl-1,3-dioxy-4,4,5,5-tetramethylimidazoline and
1-amino-7-oxyl-7-azabicycloheptane.

In many instances, it may be advantageous to have a reactive group on the free radical group and bond that to the ligand. Whenever possible, this group would provide the same type or possibly even the same functional bridge to the ligand. In effect, it could merely be the reverse situation, the final compound being the same as if the linking group had been present in reverse on the ligand. For example, if there is an amino group on the ligand, it would be possible to modify the ligand group so as to form an isocyanate. Similarly, if there is an amino group on the free radical, it is also possible to modify that amino group to form an isocyanate. The bridge will be the ureylene, irrespective of which procedure was used.

Illustrative compounds which can be used for linking the free radical functionality to the ligand are 1-oxyl-2,2,5,5-tetramethyl-3-isocyanatopyrroline,
1-oxyl-2,2,5,5-tetraethyl-3-isothiocyanatopyrrolidine,
N-(1-oxyl-2,6-dimethyl-2,6-dibenzylpiperidin-4-yl) succinamic acid,
N-(1-oxyl-2,2,5,5-tetraethylpiperidin-4-yl) maleamic acid,
N-(1-oxyl-2,2,5,5-tetrabutylpyrrolidin-3-yl) oxalamic acid,
mono-(1-oxyl-2,2,5,5-tetramethylpiperid-4-yl) fumarate,
N-(1-oxyl-2,2,5,5-tetramethylpiperid-4-yl) glycine,
1-oxyl-2,2,5,5-tetramethylpyrrolid-3-ylsulfonylacetic acid,
1-oxyl-2,2,5,5-tetramethyl-3-hydroxypyrrolidine,
1-oxyl-2,2,5,5-tetramethylpyrrolin-3-ylcarboxylic acid,
N-(1-oxyl-2,2,5,5-tetramethylpyrrolidin-3-yl) terephthalamic acid,
1-oxyl-2,2,5,5-pyrrolidin-3-yl malonate,
1-oxylpyrrolin-3-yl-3,5-dispiro-(1'-cyclopentane) carboxylic acid,
4,4,5,5-tetramethyl-1,2,3-trioxyimidazoline,
4,4,5,5-tetrapropyl-2-bromomethyl-1-oxyl-3-oxide-imidazoline,
4,4,5,5-tetrabenzyl-2-(p-aminophenyl)-1-oxyl-3-oxide-imidazoline,
4,4,5,5-tetramethyl-2-chlorosulfonylmethyl-1-oxyl-3-oxide-imidazoline,
4,4,5,5-tetramethyl-2-carboxymethyl-1-oxyl-3-oxide-imidazoline,
4,5-dimethyl-4,5-(butylene-1,4)-2-isocyanatomethyl-1-oxyl-imidazoline,
4,4,5,5-tetramethyl-2-carboxycarbonyl-1-oxyl-3-oxide-imidazoline, and
2-chlorocarbonyl-1-oxyl-3-oxide-imidazoline-4,5-dispiro(1'-cyclohexane).

Linking groups

The group —X*— will vary depending on the available sites for attachment on A*. For the most part, the available groups on the ligand will be hydroxyl (—OH); amino

where $R^8$ will usually be hydrogen or alkyl of from 1 to 6 carbon atoms); mercapto (—SH); oxo (—C=O); carboxy (—CO$_2$H); and methine (≡CH), where the H is bonded, usually to an aromatic carbon atom and preferably the ring is activated by oxy or amino substituents.

The primary function of the linking group is to bond the free radical to the linking group within a relatively short distance of each other. However, the linking group may also be used to fulfill other functions, such as to modify the solubility properties of the final product. Particularly, when relatively large hydrophobic groups are employed, as in steroids, a group capable of forming a salt may be introduced into the linking group. Illustrative groups are carboxylates, sulfonates, sulfates, and quaternary ammonium salts. The counter ion may be any convenient counter ion, preferably monovalent, such as chloride, fluoride, alkali metal salt, ammonium, etc.

The linking group will usually be of from 0 to 8 carbon atoms, more usually of from 0 to 6 carbon atoms and from 1 to 8 heteroatoms, more usually of from 1 to 6 heteroatoms which are oxygen, sulfur and nitrogen, more usually oxygen and nitrogen. Any counter ion to a salt forming group is not to be counted in the number of heteroatoms. The preferred groups are the non-oxocarbonyl or thiocarbonyl, alkylamino or alkoxy as linking functionalities.

The chain length of the linking groups is preferably from 1 to 10 atoms, usually 2 to 6 atoms or the equivalent, when cyclic structures are involved.

The following tabulation indicates the various linking groups, varying with the functionalities present on the ligand and the free radical.

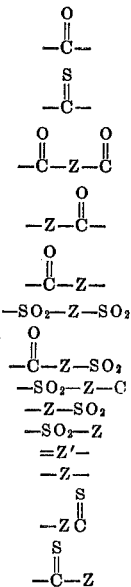

$R^9$—hydrogen or hydrocarbon of from 1 to 6 carbon atoms;
$Z'$—alkylidenyl;
Z—is a bond; hydrocarbon of from 1 to 10 carbon atoms, more usually alkylene of from 1 to 6 carbon atoms, alkenylene of from 2 to 6 carbon atoms, alkynylene of from 2 to 6 carbon atoms, cycloalkylene of from 4 to 10 carbon atoms, arylene of from 6 to 10 carbon atoms, oxalkylene of from 4 to 8 carbon atoms, and azalkylene of from 4 to 8 carbon atoms.

When the linking functionality is hydroxyl, Z or nonoxocarbonyl bond to the hydroxy is preferred, particularly Z.

When the linking functionality is amino, nonoxocarbonyl, nonoxothiocarbonyl or Z are preferred, particularly nonoxocarbonyl.

| Ligand | Free radical |
|---|---|
| (Oxocarbonyl (C=O)) | (Hydroxy (—O—); amino (—N($R^9$)—)) |
| | =N—O—Z |
| | =N—O—Z—CO |
| | =N—O$_2$C Z CO— |
| | =CHCH— |
| | =NNH—Z—CO— |
| | =NNH—Z—CS— |

| Ligand | Free radical |
|---|---|
| (Nonoxocarbonyl (—C(=O)—)) | (Hydroxy (—O—); amino (—N($R^7$)—)) |
| | —O—Z—CO— |
| | —N($R^7$)—Z—CO— |
| | —N($R^7$)—Z— |
| | —O—Z— |

| Ligand | Free radical |
|---|---|
| (Methine (≡CH)) | (Hydroxy (—O—); amino (—N($R^9$)—)) |
| | —N$_2$—Z″— |
| | —N$_2$—Z″—CO— | wherein Z and $R^7$ are as defined previously and Z″ is arylene of from 6 to 10 carbon atoms.

Where the free radical group has a carboxy functionality (nonoxocarbonyl), the groups would then be

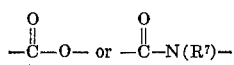

where the oxygen and nitrogen are bonded to any of the linking groups indicated above, and where Z or Z″ is bonded to the oxygen or nitrogen.

Where the free radical has an oxocarbonyl group and the ligand an hydroxy or amino group, one need only reverse the linking group for the oxocarbonyl on the ligand and hydroxy or amino on the free radical group.

The following table indicates the linking groups for oxocarbonyl being present in the free radical and other than hydroxy or amino on the ligand.

| Ligand | Free radical |
|---|---|
| (Oxocarbonyl (C=O)) | (Oxocarbonyl (C=O)) |
| | =N—O—Z—O—N= |
| | =N—O$_2$C—Z—CO$_2$N= |
| | =N—O—Z—CO$_2$N= |
| | —NNH—Z—NHN= |

| Ligand | Free radical |
|---|---|
| (Nonoxocarbonyl (C=O)) | (Oxocarbonyl (C=O)) |
| | —O—Z—O—N= |
| | —N($R^7$)—Z—O—N= |
| | —O—N= |
| | —O—Z—HNN= |
| | —N($R^7$)—ZHNN= |

| Ligand | Free radical |
|---|---|
| (Methine (=CH—)) | (Oxocarbonyl (C=O)) |
| | —N$_2$—Z′—O—N= |
| | —N$_2$—Z′—NHN= |
| | —N$_2$—Z CO$_2$N= |
| | —N$_2$—Z CONHN= |

Where the ligand has a mercapto group, the maleimide functionality is particularly useful, where the imide nitrogen is either directly bonded to the free radical group, or bonded through the functionalities described above e.g. carboxymethyl.

While for the most part, the free radical functionality may be bonded to any convenient position of the ligand, either through a functionality naturally present in the ligand or one introduced synthetically, there are preferred methods of bonding the free radical functionality to the ligand. First, it should be recognized that the free radical substituted ligand need not have any biologic activity. One is solely concerned in not disturbing the geometry and polar site relationships of a substantial portion of the molecule. Therefore, assuming synthetic convenience, the free radical functionality will normally be introduced at one end of the molecule.

Furthermore, if one is attempting to assay one of a variety of molecules which are quite similar, for example steroids, but differing in their substituents at the 17 position, one would choose to mark the molecule with the free radical functionality at a site distant from the functionality, which provides the distinction between the compound to be assayed and similar compounds which may also be present in the composition which is being assayed. For example, in assaying for steroids, it would frequently be preferable to bond at the 3 position rather than at the 17 position, since the distinctive portion of the molecule is normally at the 17 position, the 3 position for the most part remaining the same or differing in being an alcohol or a ketone.

With a low molecular weight polypeptide, it would also be preferable to bond the free radical group to an amino acid which is not directly involved with the receptor site and not an amino acid which is involved in the receptor site. Therefore, a primary rule is that one does not modify the distinctive area of the molecule, by bonding the free radical functionality to that area, thus creating a geometry describing the free radical functionality and not the functionality of the molecule.

Also, it may be found that better binding with a receptor is achieved by having the free radical functionality bonded to one site rather than another site. This can be readily determined by preparing a number of free radical modified ligand compounds and determining their equilibrium concentration with the receptor. This is particularly true where the ligand is a hapten. Almost invariably, the site of the ligand, and usually the linking group, will be the same for bonding the ligand to the protein as the ligand to the free radical. In this way, that portion of the ligand molecule which extends from the protein and is the most likely portion of the molecule to provide a template for the antibodies, is the same portion of the molecule which remains unmodified by the linking group to the free radical group.

For an excellent discussion of linking groups for steroids, for conjugation to proteins, see Peron et al., Immunologic Methods in Steroid Determination, Appleton-Century-Crofts, New York, 1970.

RECEPTOR

In the subject invention, for the most part, the receptors will be macromolecules which have sites which recognize specific structures. The recognition of the specific structures will be based on Van der Waals forces, which provide a specific spatial environment which maximizes the Van der Waals forces; dipole interactions, either by permanent or induced dipoles; hydrogen and ionic bonding; coordinate covalent bonding; and, in some cases, covalent bonding. For a detailed discussion of mechanisms by which receptors bond ligands, see Goldstein et al., Principles of Drug Action, Harper and Rowe, New York, 1968.

The macromolecules of greatest interest are proteins and nucleic acids which are found within cells, blood, and other biological fluids. These compounds include enzymes, antibodies, ribonucleic acid (RNA) and desoxyribonucleic acid (DNA), carrier proteins, such as transcortin, thyroid binding globulin (TBG), thyroid binding prealbumin (TBP), and "bound" receptors (that is receptors bound to cell membranes).

The most convenient group of proteins for use in the subject invention are antibodies. These materials are conveniently used in the analysis of the category of ligands referred to as haptens. Antibodies are produced by introducing an immunogenic substance into the blood stream of a living animal. The response to the introduction of the immunogenic substance or antigen is the production of antibodies which act to coat the antigen and detoxify it or precipitate it from solution. The antibodies form a coat which is geometrically arranged so as to have fit the spatial arrangement of the antigen. This may be analogised to a lock and key. The interaction is normally reversible, in that the antigen is subject to displacement or removal by various means without destruction of the receptor site.

There are many materials which are antigens and will produce an immonogenic response by being introduced into the blood stream of a mammal. However, a number of materials of interest are not antigens, but are haptens, and in that situation, an extra step in preparing the antibody is required. This method of preparing antibodies with materials other than antigens is well known and may be found in Microbiology, Hoeber Medical Division, Harper and Roe, 1969. See also, Landsteiner, Specificity of Serological Reactions, Dover Publications, New York, 1962; Kabat et al., Experimental Immunochemistry Charles C. Thomas, Springfield, Ill., 1967; and Williams 1962; Kabat et al., Experimental Immunochemistry, vol. I, Academic Press, New York, 1967.

The material which is to be assayed is bonded to a protein by any convenient means and the modified proten introduced into the blood stream. The same type of bonding groups used with the free radical attachment to the ligand may be employed. The antibodies which form will include groups of antibodies which are shaped to fit the foreign moiety (hapten) bonded to the protein. Therefore, antibodies are obtained which are specific to the compound or hapen bonded to the protein. By careful separation techniques, the antbodies primarily concerned with the hapten in question, can be concentrated so as to provide an antibody composition which is primarily related to the specific hapten which was bonded to the protein.

To illustrate this method, para-aminobenzene arsonate is diazotized to form the diazo salt. By combining the diazo salt with rabbit globulin, the rabbit globulin is labeled with para-azobenzene arsonate. By introducing this composition into the blood stream of an animal other than a rabbit, for example a sheep, antibodies can be formed which will have a spatial arrangement which recognizes the azobenzene arsonate.

In addition to antibodies, there are a number of naturally occurring receptors which are specific to compounds of biological interest. Compounds for which receptors are naturally occurring include thyroxine, corticosterone, cortisone, 11-desoxycortisol, 11-hydroxyprogesterone, estrogen, insulin and angiotensin. See, for example, Vonderhaar et al., Biochem. Biophysics Acta, 176, 626 (1969). All of these ligands have been studied and reported upon in the literature in connection with studies on their binding with specific receptors.

If desired, the antibodies may be bonded to a variety of supports. The bonding may be carried out similarly to that employed for bonding the protein to a ligand. Various supports include polyacrylamides, copolymers of vinyl acetate and acrylic acid, polyvinyl esters, modified cellulose, Agarose, Sepharose, etc. The value of the support, is that the antibody may be easily separated from the solution in this manner and the clear solution analyzed. Therefore, the spectrum resulting from any of the radical absorbed on the antibody will not be present in the assay. An illustrative support is para-aminobenzamidoethyl-Bio-Gel P–60 supplied by Bio-Rad Laboratories of Richmond, Calif.

In order to demonstrate the broad spectrum of compounds which may be assayed by the subject invention, a number of different haptens of distinctively different structure and polar nature were used and bonded in a variety of ways to different nitroxide containing radical compounds. These compounds are not antigens and were therefore bonded to proteins which are then used for the formation of antibodies. The antibodies are shown as being used both with and without supports.

Experimental

The following examples are offered by way of illustration and not by way of limitation.

(All the temperatures are reported in centigrade.)

EXAMPLE I

Synthesis of 3-[2'-(2",4"-dinitroanilino)acetamido]-2,2,5,5-tetramethylpyrrolidinyl-1-oxyl Glycylamido - 2,2,5,5 - tetramethylpyrrolidinyl-1-oxyl (250 mg.) was dissolved with stirring in 2 ml. methanol. Potassium bicarbonate (0.5 g.) was added followed by 0.5 ml. of 2,4-dinitrofluorobenzene. Gas evolution subsided after one hour whereupon the solution was diluted with 10 ml. of water and extracted with three 15 ml. portions of chloroform. The combined organic layers were dried over anhydrous magnesium sulfate, filtered and evaporated. The oily residue was chromatographed on silica gel with 500 ml. of chloroform followed by 250 ml. of 1:1 chloroform/acetone. Evaporation of the solution and recrystallization of the residue by addition of benzene yielded 370 mg. (86%).

M.P. 125–127° C. (decomp.) (recrystallization from 5 ml. of ethyl acetate).

Analysis.—$C_{16}H_{22}N_5O_6$. Theor. (percent): C, 50.52; H, 5.82; N, 18.41. Found (percent): C, 50.45; H, 5.89; N, 18.17.

M.W. 380.396.

ESR spectrum $a_N = 14.1$ gauss (benzene).

EXAMPLE II

3-[3'-(2",4"-dinitrophenylamino)propyl]carbamoyl-2,2,5,5-tetramethylpyrrolidinyl-1-oxyl 3-[3'-propylamino]carbamoyl - 2,2,5,5 - tetramethylpyrrolidinyl-1-oxyl (250 mg.) was dissolved in 2 ml.

methanol with stirring and 0.5 g. of potassium bicarbonate and 0.5 ml. 2,4 - dinitrofluoro-benzene added. After 2 hours the mixture was transferred to a separatory funnel, diluted with 15 ml. water and extracted with three 15 ml. portions of chloroform. The combined organic layers were dried over anhydrous magnesium sulfate, filtered and evaporated. The brown residue was chromatographed on silica gel with ethyl acetate. Evaporation of the solvent yielded an oil which crystallized on addition of ethyl acetate/carbon tetrachloride, yellow crystals (280 mg.), M.P. 150–151.5° C.

Analysis.—$C_{18}H_{26}N_5O_6$. Theor. (percent): C, 52.92; H, 6.42; N, 17.15. Fd. (percent): C, 52.60; H, 6.40; N, 16.95.

M.W. 408.4.

EXAMPLE III 4-(2′,4′-dinitroanilino)-2,2,6,6-tetramethyl-piperidino-1-oxyl 4-amino - 2,2,6,6 - tetramethylpiperidino-1-oxyl (50 mg.) was dissolved in 2 ml. methanol with stirring and 0.5 mg. potassium bicarbonate and 0.5 ml. 2,4-dinitrofluorobenzene were added. A precipitate appeared, and after 12 minutes the reaction mixture was diluted with 15 ml. of water and extracted with three 15 ml. portions of chloroform. The combined organic extracts were dried over anhydrous magnesium sulfate, filtered and evaporated. Chromatography on silica gel with chloroform gave two yellow bands. The slower moving orange-yellow component was collected and the residue obtained from evaporation of the solvent was recrystallized from chloroform to give orange crystals, M.P. 178–179° C. followed by resolidification and remelting at 189–190° C.

Analysis.—$C_{15}H_{21}N_4O_5$. Theor. (percent): C, 53.40; H, 6.28; N, 16.61. Fd. (percent): C, 53.29; H, 6.18; N, 16.38.

M.W. 337.3.

EXAMPLE IV

3-[2′-(O$^{3″}$-morphino)acetamido]-2,2,5,5-tetra-methylpyrrolidin-1-oxyl

3 - bromoacetamido - 2,2,5,5 - tetramethylpyrrolidin-1-oxyl (139 mg.) and 153 mg. morphine were refluxed under nitrogen in 4 ml. ethanol with 22 mg. sodium hydroxide for 2 hours. The reaction was diluted with water and 2 ml. of 2 M potassium hydroxide was added. After extraction with chloroform and reextratcion of the extracts with water, the chloroform solution was dried with magnesium sulfate and evaporated to give a yellow residue (glass) M.P. 75–81° C. Attempts to recrystallize it failed. Chromatography on silica gel with chloroform/methanol 9:1 gave one main fraction which was the nitroxide radical. The radical was isolated by methanol extraction of the silica gel, rechromatographed, and isolated as before. Evaporation of the methanol, redissolution in chloroform, and centrifugation removed silica gel that was soluble in the methanol. On evaporation 113 mg. of a yellow glass was obtained.

ESR spectrum: $\alpha_N = 14.58$ gauss (CHCl$_3$).

EXAMPLE V

4-[2′-(O$^{3″}$-morphino)acetamido]-2,2,6,6-tetramethyl-piperidino-1-oxyl

Morphine (153 mg.) was dissolved in 4 ml. abs. ethanol under nitrogen and 146 mg. of 4-bromoacetamido-2,2,6,6-tetramethylpiperidino-1-oxyl were added with stirring. After stirring the solution for 2 hours under reflux it was kept overnight at room temperature. The solution was diluted with water and extracted with chloroform (2× 30 ml.). The combined organic layers were reextracted with 50 ml. water (3 drops M KOH) and then dried over anh. Mg·SO$_4$. After filtration and evaporation of the solvent there remained a brown oil, which showed one main component by thin layer chromatography (TLC). The product could not be crystallized.

EXAMPLE VI 3-(O$^{3″}$-morphinomethyl)-2,2,5,5-tetramethyl-pyrrolin-1-oxyl (A) To a stirred solution of 100 mg. (0.58 mmole) of 3 - hydroxymethyl - 2,2,5,5 - tetramethylpyrrolin-1-oxyl and 11.49 mg. (0.62 mmole) of tri-n-butylamine in 15 ml. of absolute ether was added 71.3 mg. (0.60 mmole) of thionyl chloride. The reaction was stirred at room temperature for 2 hours and then evaporated. The resulting oil was purified by TLC on silica gel plates with chloroform. The yellow liquid obtained was used directly in the next reaction.

(B) Sodium hydride was dissolved in absolute ethanol, and titrated with standard hydrochloric acid to a phenolphthalein end point.

Morphine (30.2 mg., 0.10 mmole) was dissolved in ethanol containing 0.10 mmole of sodium hydride and stirred under nitrogen to which was added 18.8 mg. (0.1 mmole) of the above compound dissolved in 1 ml. of absolute ethanol and the solution was refluxed for 2 hours. The reaction mixture was then decanted and evaporated. The resulting oil was purified by TLC, using silica gel plates with chloroform-methanol, 9:1, as the eluent. The product was a yellow glass, 15 mg.

EXAMPLE VII

O$^3$-carboxymethyl morphine

Morphine (909 mg.) was dried for 4 hours at 50° C., 0.01 mm. Hg. The dried morphine was dissolved in 18 ml. of abs. ethanol and 350 mg. dry sodium chloroacetate was added, followed by 125 mg. sodium hydroxide. After purging with nitrogen, the solution was stirred and refluxed for four hours. The hot solution was treated with 3.8 m. ethanolic hydrogen chloride (0.85 M) and then filtered while still warm. On cooling overnight, a precipitate (272 mg.) formed which was collected and recrystallized from ethanol/water. On addition of ether to the original filtrate an additional precipitate was obtained which was also recrystallized from ethanol/water. Total yield 600 mg. (55%). On heating this product to 75° C. in vacuo there was a weight loss corresponding to 0.48 molecule of ethanol or 1.15 molecule of water. The dried compound decomposes at 190–220° (depends on rate of heating).

Analysis.—$C_{19}H_{21}NO_5$. Theor. (percent): C, 66.45; H, 6.16; N, 4.08. Fd. (percent): C, 65.87; H, 6.98; H, 4.09; 4.07.

MNR (C$_5$D$_5$N) 2.44 p.p.m. (—CH$_3$), 5.08 p.p.m. (—CH$_2$—COO).

EXAMPLE VIII

Conjugation of carboxymethyl morphine with poly-L-lysine (PLL)

50 mg. poly-L-lysine hydrobromide (Miles Lot. LY 115A) (1.14×10$^{-6}$ mole) were suspended in 1 ml. dry DMF and 0.241 ml. of 1 N NaOH was added. The slurry dissolved nearly completely (5 mg. residue).

In a separate flask 12.4 mg. (0.033 mM.) of carboxymethyl morphine were dissolved in 1 ml. dimethyl formamide (DMF) (less DMF will not dissolve the acid) and cooled to —15° C. To this solution was added 3.28 g. (0.033 mM.) of ethyl chloroformate. The solution was stirred at —15° C. for 20 minutes after which the poly-L-lysine solution was added followed by the addition of 2 ml. of DMF used to wash the flask that contained the poly-L-lysine. A precipitate formed. The reaction was stirred overnight at 0° C., diluted with water and dialyzed against distilled water (6 changes). Lyophilization gave 19 mg. residue.

Determination of the degree of conjugation

The ultraviolet spectrum was measured at 280 nm. in a 1 cm. cell: $d=0.25$ when the concentration was 0.287 g./l. in water.

$$\epsilon^{\text{carboxymethyl morphine 280}} = 1070, \quad \epsilon^{280}_{\text{PLL}} = 0$$

The degree of conjugation can be determined from this data and the formula:

$$d = \frac{(X_{\text{carboxymethyl morphine}+\text{PLL}})W}{X MW_{\text{CCM}} + MW_{\text{PLL}}}$$

where X=number of haptens per molecule, W=weight of protein conjugate per liter and MW is the molecular weight where CMM refers to the hapten and PLL refers to the protein. Since the molecular weight of the protein was 27,000

$$X = 30 \text{ haptens/molecule}$$

EXAMPLE IX

Conjugation of carboxymethyl morphine to bovine serum albumin (BSA)

Carboxymethyl morphine (240 mg.) suspended in 8 ml. dry DMF was cooled to $-15°$ C. and treated with 84 μl. isobutyl chloroformate. The solid dissolved while stirring for 30 minutes at $-15°$ C. BSA (400 mg.) dissolved in 56 ml. water containing 2.6 g. sodium bicarbonate was added to this solution and the mixture was kept at 0° C. overnight. It was then dialyzed against distilled water with 4 changes of water (dialysis 1:80) and lyophilized to give 350 mg. of conjugate.

Hapten concentration on the protein:

$$d = 0.59 \quad \epsilon^{280}_{\text{BSA}} \ 41{,}600 \quad \epsilon^{280}_{\text{CMM}} = 1070$$

$$MW_{\text{CMM}} = 327 \quad MW_{\text{BSA}} = 64{,}400$$

EXAMPLE X

Binding of antibodies to support (A) Para - aminobenzamidoethyl - Bio - Gel P-60 (50 mg.) was suspended in 10 ml. of water and acidified with 1 N hydrochloric acid to pH 4.5. The suspension was cooled to 4° C. and 6 mg. sodium nitrite dissolved in 2 ml. water added over a period of 10 minutes. A one ml. portion of $10^{-5}$ M solution of purified morphine antibodies was mixed with the above material at pH 9 while maintaining the temperature. After 40 minutes, 20 mg. resorcinol was added to scavenge the remaining diazonium compound. The solid was then filtered and washed with pH 8 borate buffer.

(B) The above supported morphine antibodies (50 mg.) were suspended in 10 ml. of pH 8 borate buffer solution $10^{-4}$ M in 4-[2'-(O3''-morphino)acetamido]-2,2,6,6-tetramethylpiperidino-1-oxyl and stirred for 2 hours. Filtration and washing with water gave a solid (50 mg.) which showed broad ESR signals indicating the binding of the free radical labeled morphine to the receptor.

EXAMPLE XI

Isolation of antibodies

In 20 ml. of dimethyl formamide was introduced 400 mg. aminoethyl-Bio-Gel P-60 and 300 mg. of carboxymethyl morphine (see Example 7) and 1 g. sodium bicarbonate added. After stirring the suspension for two days at 4° C., the suspension was filtered, the residue washed with water until the washings were neutral, and then the residue was dried in vacuum.

The resulting product was then suspended in 20 ml. rabbit serum containing morphine antibodies and stirred for 4 hours at 4° C. Filtration gave a residue which was resuspended in 5 ml. phthalate buffer, pH 3.8 (0.1 M) and stirred for 2 hours. The gel was separated by centrifugation and the supernatant liquid dialyzed against phosphate buffer, pH 7.4 (0.1 M) to give a buffered solution of substantially pure antibodies.

EXAMPLE XII

Preparation of rabbit serum and γ globulin

Antisera may be obtained as follows: The antigen (hapten coupled to an appropriate protein) is made up in a saline solution (9 g./liter) at a 2 mg./ml. concentration. Per 1.0 ml. aliquot of the above solution introduced, there is introduced simultaneously 3 ml. of Complete Freund's Adjuvant in homogenized form by means of a two-way needle. For subcutaneous injections, approximately 0.3 ml. (antigen+Freund's solution) is injected per site and for intraperitoneally injections, approximately 0.4 ml. is injected. The total dosage is about 4.0 ml. per rabbit.

After 3 to 4 weeks, a booster shot is given intramuscularly consisting of 0.5 ml. of the above saline solution and 0.5 ml. of Complete Freund's Adjuvant. A period of 5 to 7 days is allowed to pass and the rabbit is bled by heart puncture.

When the desired amount of blood is collected, the blood is allowed to clot and the clot removed. The remaining solution is then centrifuged at 2,000 r.p.m. for 10 minutes. The serum is collected free of loose red cells.

An equal volume of saturated ammonium sulfate solution is added to the serum dropwise with stirring at 4° C. After standing for 1 hour at that temperature, the solution is centrifuged at 10,000 r.p.m. for 15 minutes and the supernatant removed. The residue is suspended in as small a volume as possible of 1× PBS (phosphate buffered saline, see below for description), transferred to a dialysis bag and dialyzed overnight against 1× PBS pH 7.0. The residue in the dialysis bag is then isolated and frozen.

(To make 1 l. of 10× PBS combine 76.5 NaCl, 7.25 g. $Na_2HPO_4$ (anh.), 2.12 g. of $KH_2PO_4$ and 10.0 g. of $NaN_3$; make up to 1 liter with distilled water, and adjust pH to 6.5 with 1 N HCl. The 1× PBS is obtained by diluting 10× (tenfold), the pH changing to 7.0–7.1 as a result of the dilution.)

EXAMPLE XIII

Phenobarbital-BSA conjugate

Sodium phenobarbital (5.08 g., 0.02 mole), methyl chloroacetate (2.16 g., 0.02 mole), methanol (14 ml.) and a catalytic amount of DMF (1 ml.) were refluxed for 2 hours. A white precipitate separated out during this period. The reaction mixture was cooled to room temperature and filtered. The methanolic filtrate was evaporated to dryness to yield about 5 g. of a gummy material which solidified on standing. (The precipitate from the above filtration partially dissolved when rewashed with distilled water. The water-insoluble material, about 50 mg., proved to be the dialkylated product.)

The solidified material was stirred with 20 ml. of 1 N NaOH solution for 15 minutes and then filtered. This separated the alkali-insoluble derivatives from monoalkylated product and unreacted phenobarbital. The alkaline filtrate was acidified with conc. HCl to a pH 2 and the white gummy precipitate which formed was taken up in methylene chloride.

Drying ($MgSO_4$) and evaporation of the organic solvent yielded 4 g. of gummy material. This was dissolved in benzene and chromatographed over a column of silica gel (40 g.). Elution was with chloroform and 100 ml. fractions were collected. (The progress of the chromatography was followed by TLC, since the dialkylated product has an $R_f$ 0.9, the monoalkylated material $R_f$ 0.6 and phenobarbital $R_f$ 0.1 with chloroform/methanol 95:5.)

Fractions 2–5 combined yielded on evaporation 1.6 g. of a gum which solidified on standing. Trituration with petroleum ether and filtration yielded 1.5 g. of a white powder which was shown by NMR to be the required monoalkylated derivative, N - methoxycarbonylmethylphenobarbital.

Further elution with chloroform (500 ml.) yielded 1.5 g. of a white solid which was shown to be unreacted phenobarbital.

(B) The monoester prepared above (1 g.) was refluxed with 10 ml. of 20% HCl solution for 3.5 hours. The cooled reaction mixture was diluted with water (20 ml.) and extracted with ether. Evaporation of the other extract yielded 0.98 g. of a colorless gum which very slowly solidified on standing. NMR and TLC showed that complete hydrolysis had occurred to the acid.

A pure sample of the acid was prepared by preparative TLC for UV analysis, with chloroform/methanol (5:1) as eluent.

(C) Carboxymethylphenobarbital prepared above (3 ml.) was cooled to −15°. To the magnetically stirred solution was added triethylamine (0.14 ml., 1.0 mmole) and isobutylchloroformate (0.13 ml., 1 mmole). The reaction mixture was stirred at −15° for 10 minutes and then at 0° for 30 minutes. The mixed anhydride prepared above was added slowly to an ice-cooled solution of bovine serum albumin (BSA) (400 mg.) in water (56 ml.) containing sodium bicarbonate (2.6 g.). The reaction mixture was stirred at 0° for 6 hours and was then dialyzed against distilled water with four changes of 4 l. of water each. The dialyzed solution was then centrifuged and decanted to obtain 118 ml. of a clear solution. Lyophilization of 10 ml. of this solution yielded 0.0362 g. of protein conjugate equivalent to a total yield of 0.427 g. of conjugate. The bulk of the solution was dialyzed again with a phosphate buffer at pH 8 with 4 changes of the buffer solution in intervals of 3, 17, 25 and 49 hour intervals. Finally, dialysis against water for 48 hrs., followed by freeze-drying, yielded 0.325 g. of protein conjugate. A UV calibration curve with BSA and carboxymethylphenobarbital in $H_3BO_3/NaOH/KCl$ buffer at pH 10 provided the means for determining the number of hapten molecules loaded on the BSA. This was found to be 15 carboxymethylphenobarbital molecules per molecule of BSA.

EXAMPLE XIV

Secobarbital-BSA conjugate (A) Ozone was passed through a cooled (Dry Ice/acetone) solution of sodium secobarbital (2.6 g., 0.01 mole) in methanol (250 ml.). After ozonolysis was completed (positive KI test), nitrogen was passed through the reaction mixture to remove all traces of ozone and then dimethyl sulfide (7 ml.) was added to the cold solution with a syringe and allowed to stand overnight at room temperature. After evaporation of the solvent, the residue was diluted with water (20 ml.), acidified with conc. HCl and extracted with chloroform (3× 20 ml.). The chloroform extract was dried ($MgSO_4$) and evaporated to yield 2.4 g. of gummy colorless material. NMR showed the presence of an aldehyde group at δ 9.7 p.p.m. This was used without further purification in the reaction with malonic acid.

(B) A sample of pure aldehyde (0.24 g., 1 mmole), malonic acid (0.21 g., 2 mmoles), 20 ml. pyridine and 1 ml. piperidine were refluxed together for 6 hours. The solvent was removed on the flash evaporator and the residue dissolved in 10% sodium bicarbonate solution. The bicarbonate solution was washed with ether (3× 20 ml.) and then acidified with conc. HCl. Extraction with ether (2× 20 ml.) and then with chloroform (2× 25 ml.) followed by drying ($MgSO_4$) and evaporation of the combined organic layers yielded 0.23 g. (80% yield) of a white solid shown by NMR to be the desired acid 5 - (α-crotonic acid)-5-(1′-methylbutyl)barbituric acid. Recrystallization from $CHCl_3/CCl_4$ yielded 0.16 g. of pure material.

(C) To a solution of 5-(α-crotonic acid)-5-(1′-methylbutyl)barbituric acid (0.282 g., 1 mmole) in DMF (3 ml.), cooled to −15° (ice-salt bath) there was added triethylamine (0.28 ml., 2 mmoles) and isobutylchloroformate (0.13 ml., 1 mmole). Stirring was continued at −15° for 15 minutes and then at 0° for 30 minutes. The reaction mixture was then added dropwise, with a syringe, to a cooled solution of BSA (400 mg.) in water (56 ml.) containing $NaHCO_3$ (2.6 g.). The reaction mixture was stirred at 0° (cold room) for 5 days when initial turbidity had nearly all disappeared. The solution was then dialyzed against 4 l. of phosphate buffer (pH 8) followed by distilled water to yield the desired conjugate.

The anhydride can be used for coupling to 4-amino-2,2,6,6 - tetramethylpiperidino-1-oxyl or 3-amino-2,2,5.5-tetramethylpyrrolidino-1-oxyl to form the free radical labeled ligand.

EXAMPLE XV

Conjugation of meperidine to bovine serum albumin (BSA)

(A) Meperidine hydrochloride (142 mg.) was refluxed under nitrogen in 2.5 ml. potassium hydroxide (4 M) and 5 ml. methanol for two hours. The methanol was removed on the rotary evaporator. The aqueous solution was neutralized to pH 8.1. A precipitate formed which is collected and dried. 79 mg. (76%). M.P. 298–300°.

(B) 4-carboxy-1-methyl-4-phenyl-piperidine (54.8 mg.), prepared above, was suspended in 3 ml. DMF. The solution was cooled at −15° and 32.8 μl. isobutylchloroformate was added. The mixture was maintained at −15° with stirring. After 30 minutes the solution was added to a solution of 161 mg. BSA in 18 ml. water which had dissolved in it 1.1 g. of sodium bicarbonate. The mixture was kept in the cold room overnight. It was dialyzed against distilled water (80:1) with 3 changes during 36 hours. On lyophilization 159 mg. residue remained. It contained 32 haptens per molecule BSA as shown by UV analysis.

EXAMPLE XVI 3-(4′-(4′-phenyl-1′-methyl piperidin)carbamoyl)-2,2,5,5-tetramethyl-1-pyrrolidinyloxyl (A) 4-carboxy-1-methyl-4-phenyl-piperidine (110 mg.) (see Example XV) was refluxed in 3 ml. of freshly-distilled THF and 178 mg. (110 μl.) thionyl chloride for 30 minutes. The insoluble acid resulted in a voluminous precipitate. After removal of the solvent in vacuo the residue was dissolved in 3 ml. dry pyridine and added to 231 mg. 3-amino-2,2,5,5-tetramethyl-1-pyrrolidinyloxyl. After one hour at 0° the reaction was diluted with water and the pH adjusted to 11. Two extractions with ether and two extractions with ethyl acetate removed the radical from the aqueous phase. The residue from the extraction was separated by preparative TLC. The yellow band with the lowest $R_f$ value contained an amide (IR). It was removed from the silica gel with methanol and recrystallized from benzene/hexane. M.P. 84–86°.

EXAMPLE XVII

Conjugation of 4-carbethoxy-1-carboxymethyl-4-phenyl-piperidine to bovine serum albumin (BSA)

(A) 4-cyano-4-phenylpiperidine hydrochloride (2.23 g.) was dissolved in 15 ml. water to which was added 4 ml. of 50% aqueous potassium hydroxide. The oil was extracted with 3× 15 ml. ether and the organic layers were dried over an anhydrous magnesium sulfate. Filtration and evaporation of the solution gave a residue which was placed in a glass ampoule along with 3 ml. of methanol and 1.23 ml. of 50% aqueous potassium hydroxide. The sealed ampoule was heated to 165–170° for 3.5 hours and diluted with 50 ml. water. After extraction with chloroform the aqueous phase was neutralized with Dowex 50–X8 (H+ form) to pH 6. Filtration and evaporation yielded a residue (0.82 g.) which melted above 300°. Recrystallization from water and drying over phosphorous pentoxide gave a compound with M.P. 285–286°.

(B) 4 - carboxy - 4 - phenylpiperidine (1.8 g.) was refluxed in 50 ml. of 5% ethanolic hydrochloride for four hours. The residue on evaporation of the solvent was dissolved in acetone and the insoluble part filtered off. From the acetone solution a viscous oil remained on evaporation, which crystallized on standing. M.P. 107–110° (1.068 g.). It was used without further purification; or (B') A solution of 4 - cyano - 4 - piperidine hydrochloride in 6 ml. 66% sulfuric acid was heated to 145° and stirred for 45 minutes. On cooling to 125° the solution became slightly more viscous. The addition of alcohol (stem of the addition funnel below the surface of the reaction mixture) lowers the temperature to 105°. It was kept there for four hours. During the first hour 20 ml. alcohol were added, in the next hours 6 ml. each. The alcohol vapors were removed by a continuous distillation. At the end of the addition the temperature was raised to 125° until no condensate is formed any more. The hot solution was poured into 6 ml. water/40 gm. ice containing 8 g. sodium hydroxide. After extraction with 3× 70 ml. ether, drying over anhydrous magnesium sulfate and removal of the solvent an oil remained which was distilled at 112–115°/0.2 mm. Hg; 4.01 gm. (54%).

(C) 4 - carbethoxy - 4 - phenylpiperidine (4.01 g.) was dissolved in 13 ml. absolute alcohol and refluxed together with 2.01 g. sodium chloroacetate. After 7 hours no starting material was present as evidenced by TLC. The precipitated sodium chloride was removed by filtration and washed with 3 ml. ethanol. On cooling of the filtrate white crystals appeared. Filtration and drying gave 2.9 g. (58%) of the title compound. M.P. 148–150° C. Evaporation of the mother liquor gave a glass which did not crystallize from acetone/hexane.

(D) A solution of 1.76 g. 4 - carbethoxy - 1 - carboxymethyl-4-phenyl-piperidine in 65 ml. absolute DMF were cooled to −10° and to this 680 μl. isobutylchloroformate were added. The reaction was kept at −10° for 45 minutes while stirring. The mixed anhydride is added dropwise to 3.2 g. BSA dissolved in 450 ml. water containing 21 g. sodium bicarbonate. A slight turbidity occurred after ⅓ of the DMF solution was added. It was partially removed by addition of another 250 ml. water. After stirring at 4° overnight and dialyzing against distilled water for 2 days, the solution was centrifuged to remove the precipitate and lyophilized. UV analysis showed 46 haptens per molecule BSA.

EXAMPLE XVII 3-(2-(4-carbethoxy-4-phenyl-piperidino-1)acetamido)-2,2,5,5-tetramethyl-1-pyrrolidinyloxyl 4 - carbethoxy - 4 - phenylpiperidine (69.3 mg.) was dissolved in 2 ml. ethanol and 82.3 mg. of 3-(2-bromoacetamido)-2,2,5,5-tetramethylpyrrolidinyloxyl-1 in 2 ml. ethanol are added together with 40.8 mg. potassium carbonate. The solution was refluxed for 2 hours and diluted with 20 ml. water. On extraction with ether all of the yellow color went readily into the organic phase. The residue from the organic phase was recrystallized twice from benzene/hexane and yields 118 mg. of yellow crystals. M.P. 98–99°.

EXAMPLE XIX 4-(2-(4-carbethoxy-4-phenyl-1-piperidino)acetamido)-2,2,6,6-tetramethyl-1-piperidinooxyl 4-carbethoxy-4-phenyl-piperidine (83.7 mg.) was dissolved in 2 ml. of dry ethanol and added to the solution of 104.3 mg. 4-(2-bromoacetamido)-2,2,6,6-tetramethylpiperidinooxyl in 2 ml. ethanol containing 49.8 mg. potassium carbonate. After heating the reaction to reflux for two hours the solution was diluted with 20 ml. water. The pH was adjusted to 12 and the solution extracted with ether. All the yellow color went into the organic phase. On evaporation of the ether a residue remained which was recrystallized from benzene/hexane. M.P. 137–138° (48 mg.).

EXAMPLE XX 3-carboxy-2,2,5,5-tetramethyl-1-pyrrolidinyloxyl (4'-carbethoxy-4'-phenyl)piperidide 3 - carboxy - 2,2,5,5 - tetramethyl-pyrrolidinyloxyl (52.2 mg.) was dissolved in 2 ml. of dry benzene along with 30 μl. of pyridine. 27 μl. of thionyl chloride were added to the ice-cold solution. After stirring for 1 hour the salts were removed by filtration with exclusion of moisture and washed with dry benzene. The filtrate was evaporated and the residue dried at 0.1 mm. Hg for one hour (room temperature). 4 - carbethoxy - 4 - phenylpiperidine (77.4 mg.) was dissolved in 1× 3 ml. pyridine and added to the solution of the above acid chloride at 0°. After stirring at 0° for 1 hour the reaction was diluted with 20 ml. ethyl acetate and extracted with 20 ml. 0.1 N hydrochloric acid. The residue from the organic phase was separated on preparative TLC (methanol/chloroform 1:9). There was a colorless band with a $R_f$ of 0.8 which was the title compound. After elution of the silica gel with methanol, a pale yellow compound is obtained which melted after two recrystallizations from cyclohexane at 114–116°.

EXAMPLE XXI

Preparation of amphetamine-bovine serum albumin (BSA) conjugate (A) Amphetamine sulphate (3.68 gm., 20 mmoles of amine) was dissolved in 0.5 N sodium hydroxide (80 ml.). The alkaline solution was extracted with ether, the ether dried and evaporated. The residue was dissolved in benzene (50 ml.) and diisopropylethylamine (3 ml.) was added followed by ethylbromoacetate (2.2 ml., 20 mmoles). The reaction mixture was refluxed for one hour, cooled, filtered and the filtrate evaporated. The residue was taken up in ether, washed several times with water, the ether dryed and evaporated. The pure aminoester was obtained by column chromatography on silica gel (hexane:ether 7:3). Yield 3.1 gm. (70%). NMR and IR agree with the structure.

(B) The amino-ester (2.5 gm., 11.3 mmoles) was dissolved in 1:1 mixture of methanol and 1 N sodium hydroxide (50 ml.) and left at room temperature overnight. The mixture was evaporated to a small volume, washed twice with ether (2×25 ml.) and acidified to pH 6 with conc. HCl. The crystals that separated out were recrystallized from ether-acetone to give two fractions: 900 mg., M.P. 222–25 (M.P. lit. 220–5° C., Tetra. Letters., 1966, 4603–7) and 450 m.g., M.P. 210–218°. Only the first fraction was used for further reactions.

$\lambda_{max.}^{H_2O}$ 257, ε=159

(C) Amphetamine-carboxylic acid (700 mg. 3.8 mmoles) was suspended in dry dioxane at 40° (50 ml.) and phosgene (12.5 wt. percent in benzene, 20 ml. )was added in one portion. The reaction mixture was stirred at 40–50° C. for 3½ hours, evaporated to dryness and redissolved in dry dioxane (20 ml.). This solution was kept in ice for the next step.

(D) The above solution was added in 4 portions during ½ hour to a stirred solution of BSA (2 gm.) in 100 ml. 2% NaHCO₃ solution at 0° C. The reaction mixture was kept for 24 hours at 0° C. and 18 hours at room temperature. It was dialyzed for 2 days against 35 liters of water at 0° C. and lyophylized. The volume of the dialysis solution at the end was 200 ml.; 10 ml. of it contained 110 mg.—total yield 2.2 gm. The actual amount of conjugate isolated was 1.91 gms. The degree of conjugation (from UV) was estimated to be approximately 76 units of amphetamine/BSA.

EXAMPLE XXII

3-(N-1'-phenyl-2'-propyl)glycinamido)-2,2,5,5-tetramethyl-1-pyrrolidinyloxy

A solution of amphetamine (2 mmoles, prepared from 368 mg. of the sulphate) in a methanol (20 ml.) was treated with sodium carbonate (106 mg., 1 mmole) and 3-(2-iodoacetamido) - 2,2,5,5-tetramethyl-1-pyrrolidinyloxyl (321 mg. 1 mmole). The reaction mixture was stirred overnight at room temperature, evaporated to dryness and the residue partitioned between water and ether. The residue obtained by evaporation of the ether was chromatographed on silica gel (8% methanol in dichloromethane) to give 187 mg. (59%) of a deep-yellow mixture of oil and crystals which run as a single spot on TLC in the above system ($R_f$ 0.5).

ESR (in water) $a_N$ 15.9 g.
IR: 700, 740 cm.$^{-1}$—strong.

EXAMPLE XXIII

Ecgonine-BSA conjugate (A) Cocaine (5 gm.) was refluxed in 25 ml. water for 6.5 hours. The remaining oil after evaporation of the solution was dissolved in 5 ml. hot water. On cooling long, white crystals separated (2.87 gm.). Another 543 mg. were obtained from the mother liquor.

(B) Benzoylecgonine (1 gm.) was refluxed in 25 ml. 2 N hydrochloric acid for 1 hour. After cooling, the solution was filtered and extracted with ether. The aqueous phase was neutralized with sodium bicarbonate to pH 5.8. On evaporation a white residue remained which was refluxed with 40 ml. ethanol (95%), filtered and the solvent evaporated. The oily residue (580 mg.) crystallized on addition of 0.5 ml. ethanol (130 mg.). M.P. 135–197° (decomp.).

(C) Ecgonine (119 mg.) was dissolved in 8 ml. dry dimethyl formamide (DMF and cooled to −10° C. After addition of 84 µl. isobutylchloroformate the reaction mixture was stirred for two hours.

(D) BSA (400 mg.) was dissolved in 25 ml. water together with 2.1 g. sodium bicarbonate. The mixed anhydride prepared above was added dropwise and the reaction mixture stirred overnight at 0° C. The solution was transferred to a dialysis bag and was dialyzed against 1 liter of water for 24 hours (4 changes of the dialysate, 1:20 dialysis). On lyophlization a white compound was obtained. UV analysis showed that 18 haptens/molecule BSA were present.

Cholesterol can be employed or other steroids having the 3-hydroxy functionality and either non-interfering functionalities at the 17 position or protected functionalities at that position. Cholesterol may be reacted with ethyl bromoacetate followed by basic hydrolysis to provide the 3-carboxymethylether. Again, as described above, the mixed anhydride may be prepared and the mixed anhydride reacted with any of the proteins previously indicated and the resulting product introduced into an animal to provide antibodies. Similarly, the mixed anhydride may be reacted with 2,2,6,6-tetramethyl-4-aminopiperidino-1-oxyl or 2,2,5,5-tetramethyl-3-hydroxy (or 3-amino)pyrrolidine-1-oxyl.

Phenobarbital may be used in a different manner than described earlier. Phenobarbital may be prepared and modified by introducing an amino group in the para position of the 5-phenyl substituent. By diazotization of the diazo group, protein can be labeled with the phenobarbital and the resulting protein introduced into an animal to provide the desired antibodies. The same amino-modified phenobarbital may be combined with 4-carboxy-2,2,5,5-tetramethylpyrrolidine-1-oxyl or 2,2,6,6-isocyanato piperidino-1-oxyl.

To illustrate the assay for sugars, lactose, (4-β-D-galacotopyranosido)-D-glucopyranose may be prepared as the para-diazophenylether at the 1 position which may then be coupled with 2-(1'-(3'-hydroxyphenyl))-4,4,5,5-tetramethylimidazolinyl-1-oxyl-3-oxy. Also, the diazo compound may be coupled with a protein, such as BGG for use in preparation of antibodies. See F. C. Karush, J. Am. Chem. Soc., 79, 3380 (1957).

Aspirin may also be assayed by using the 4-amino-2-acetoxybenzoic acid, diazotizing the amino group in a manner similar to that of the aminophenol employed above, and then conjugating the diazotized compound with BSA. The amino group may also be reacted with the carboxy derivative or isocyanato derivative of 2,2,5,5-tetramethyl-3-carboxy or (3-isocyanato pyrrolidine-1-oxyl or 2,2,6,6-tetramethyl-4-carboxy (or 4-isocyanato) piperidine -1-oxyl.

To illustrate the assay of a toxic substance such as a pesticide, malathion (diethyl 2-(O,O-diethyl phosphorothionothioyl succinate) may be modified so as to form the half ester, half acyl chloride which may then be used to conjugate with a protein such as BSA. Alternatively, the acyl halide may be reacted with 3-(para-aminophenyl)-1,5-diphenylverdazyl.

Besides the hapten ligands which are employed with antibody receptors, there are other ligands, which have naturally occurring specific receptors. The following table illustrates such ligands with a prior art reference which discloses a suitable receptor for such a ligand. Also shown are suitable free radical analogs which may be used in the assay for the ligand in accordance with a method disclosed previously.

TABLE I

| Ligand | Receptor for ligand reference | Ligand structure |
|---|---|---|
| Thyroxin | Thyroxin Binding Globulin (TBG); Thyroxin Binding Prealbumin (TBA); B.E.P. Murphy, C. J. J. Pattee, J. Clin. Endocr., 24, 187 (1964). | 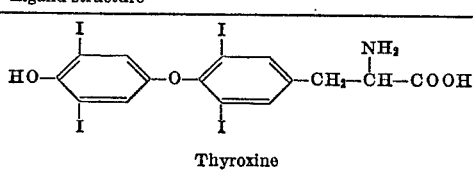<br>Thyroxine |
| Corticosterone | Protein From Brain Cell Nuclei, B. McEwen, L. Plapinger Nat. 226, 263 (1970). | 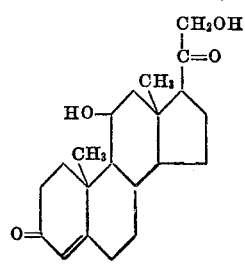<br>Corticosterone |

TABLE I—Continued

| Ligand | Receptor for ligand reference | Ligand structure |
|---|---|---|
| Cortisol (R=OH, H); Cortisone (R=O); 11-desoxycortisol (R=H, H). | B. E. Murphy, J. Clin. Endocr., 28, 343 (1968), 27, 973 (1967) Corticosteroid Binding Globulin (Transcortin). | 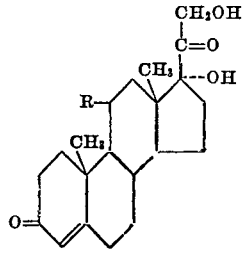 Cortisone |
| Estradiol | Receptor Site for Estrogen From Uterus, BBA, 176, 626 (1969). | 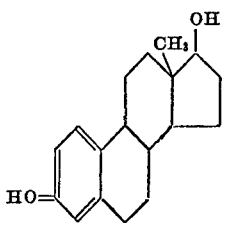 Estradiol |
| Insulin | C. R. Morgan, W. M. Holland, III Diabetes, 1966 | (1). |
| Angiotensin II | L. B. Page, E. Haber, A. Y. Kimura, A. Purnode, J. Clin. End. 28, 200 (1969). | (2). |

[1] H-Gly-Ile-Val-Glu-Glu-Cys-Cys-Ala-Ser-Val-Cys-Ser-Leu-Tyr-Glu-Leu-Glu-Asp-Tyr-Cys-Asp-OH (with NH₂, S—S, NH₂, NH₂, NH₂ substituents and S—S bridge to)

H-Phe-Val-Asp-Glu-His-Leu-Cys-Gly-Ser-His-Leu-Val-Glu-Ala-Leu-Tyr-Leu-Val-Cys-Gly-Glu-Arg-Gly-Phe-Phe-Tyr-Thr-Pro-Lys-Ala-OH (with NH₂, NH₂)

[2] Asp-Arg-Val-Tyr-Ileu-His-Pro-Phe.

In addition to the naturally occurring receptors disclosed in the prior table, enzymes may also be used as receptors. The following table indicates several typical enzymes and ligands with which they interact. Also, suitable free radical ligand analogs are provided. The references indicate publications which refer to the specific interaction between the ligand and enzyme.

TABLE II

| Enzyme receptor | Ligand |
|---|---|
| Cholinesterase (Goldstein, p. 9-10) [1] | 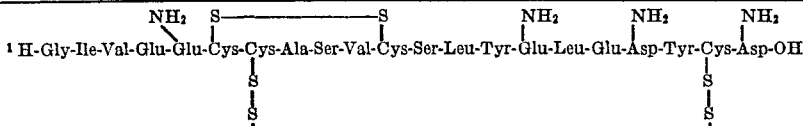 neostigmine |
| Thymidylate Synthetase (Baker, p. 113-114) [2] | 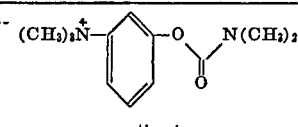 5-fluorodeoxyuridylic acid |
| Dihydrofolate Reductase (Goldstein, p. 426, 532) [1] (Baker, p. 197 et seq.) | 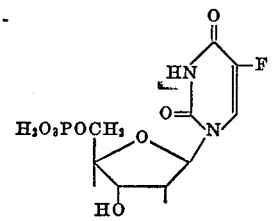 Methotrexate |
| Monoamine Oxidase (Goldstein, p. 257) [1] | 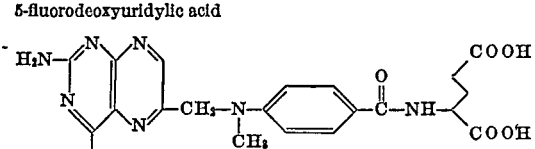 Iproniazid |

See footnotes at end of table.

TABLE II—Continued

| Enzyme | Ligand |
|---|---|
| Phosphoribosyladenosine Triphosphate pyrophosphorylase (Goldstein p. 541-543)[1] | 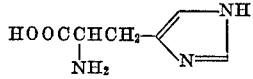<br>Histidine |

[1] "Principles of Drug Action" by A. Goldstein, L. Aronow and S. M. Kalman, Harper & Row Publishers, New York, 1970.
[2] "Design of Active-Site-Directed Irreversible Enzyme Inhibitors" by B. B. Baker, John Wiley and Sons, Inc., New York, 1967.

In selecting enzymes are receptors, it is preferred to select those enzymes which do not catalyze reactions of the ligands to be tested to avoid destruction of the test ligand before the analytical information desired is obtained. Enzyme inhibitors are therefore the best choices for receptors. Otherwise it may be desirable to omit a material needed as a reagent in the catalytic reaction such as a co-enzyme. Since many drugs are enzyme inhibitors, the use of enzymes as receptors for ligands that are drugs may be good choices in practicing the present method.

Enzymes may be useful receptors in the detection of pesticidal chemicals. For example, cholinesterase interacts and is a receptor for organic phosphates which are used as insecticides. For example, the insecticide parathion

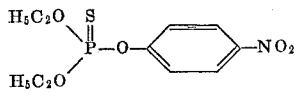

can be detected using the analog

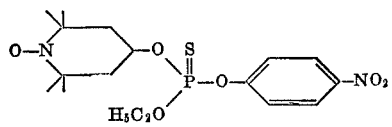

and cholinesterase as the receptor.

To demonstrate the analysis for ligands by the subject method, the labeled hapten, 3-(2',4'-dinitrophenylamino)-2,2,5,5-tetramethylpiperidine-1-oxyl, was added to the dinitrophenyl antibodies in an aqueous solution. The antibodies were prepared according to Eisen et al., JACS, 75, 4583 (1953) and the labeled hapten was prepared in accordance with Hsia et al., Archives of Biochemistry and Biophysics, 132, 466 (1969). The following procedure was employed: The quantities of the two compounds were chosen by adding small portions of the haptens to the antibody solution until the ESR signal intensity began to rise sharply with addition of each portion. At this point, all the binding sites on the antibodies were occupied by the label and the addition was stopped. Increasing amounts of N-epsilon-dinitrophenyllysine were then added to the solution. With the addition of increasing amounts of N-epsilon-dinitrophenyllysine to the antibodies-labeled hapten complex an increase in the ESR signal was observed. The results of this experiment are illustrated in FIG. 1 of the accompanying drawings.

The antibody solution had a concentration of about 2 mg./ml. which was equal to about $1-2\times10^{-5}$ M of binding site. The labeled hapten was dissolved in 20 percent aq. methanol, at about $1-2\times10^{-5}$ M concentration. Approximately 10 μl. of the antibody solution and 10-20 μl. of the labeled hapten solution were combined and varying amounts of $10^{-5}$ M solution of N-ε-dinitrophenyllysine in water added, the maximum being 14 μl.

By using appropriate standards, the ESR signal intensity may be related to the concentration of the N-epsilon-DNP lysine in solution. Therefore, by taking an unknown solution suspected of having such a hapten, and introducing a standardized amount of the autibody-hapten complex, one can rapidly determine the concentration of the N-epsilon DNP lysine in solution.

To illustrate the object method in relation to a more useful hapten, a variety of studies were made with morphine. Morphine antibodies were prepared by injection of the conjugated morphine prepared in Example IX in rabbits as described earlier. The harvested serum was used in the following experiments:

Morphine antibodies were combined with the spin labeled morphine prepared by the method of Example IV. The quantities of the two components were chosen by a titration similar to that described for bonding labeled hapten to the dinitrophenyl antibodies. To an aqueous solution of the combined labeled morphine and morphine antibody were added increasing amounts of morphine and the change in the ESR signal intensity was observed. The results are shown in FIG. 2 in the accompanying drawings.

Codeine is also detected by the same procedure because of its close structural similarity to morphine. Other closely related compounds such as nalorphine and morphine-$O^3$-glucuronide can also be detected, whereas the assay is insensitive to distantly related analogs such as methadone and unrelated compounds such as amphetamines.

As mentioned, a preferred application of the invention is to test for the presence of a drug in a biological fluid. To further illustrate, urine of drug addicts was tested in accordance with the following procedure. Morphine $O^3$-glucuronide represents the main excretion product of morphine and heroin in humans. About 80% of the total morphine ingested appears as morphine glucuronide in the urine. Since the above spin labeled morphine combined with morphine antibodies can be used to detect both this metabolite and morphine, the assay is especially effective.

Detection of morphine and its metabolite in urine

The urines were added to solutions containing spin labeled morphine of Example IV bound to morphine antibody in about pH 7.9 buffered solution and the amount of increase in the ESR signal was recorded. The amount was recorded as a percentage of the maximum increase of signal that could be obtained in the presence of high concentrations of morphine.

The labeled morphine was first dissolved in a few drops of ethanol and then dissolved in water to provide a solution of $2\times10^{-5}$ M concentration. The antibody concentration in water was about $1-2\times10^{-5}$ M based on binding sites. Included in the antibody solution was approximately 0.4 M tris or 0.6 M sodium borate to provide a pH of 7.5 with the former and 7.9 with the latter. The pH will drop due to dilution and the presence of acid in the urine. To 20 μl. of urine was added sufficient sodium dichromate to provide a concentration of $2\times10^{-2}$ M in order to destroy any interfering reducing substances. The urine sample was then combined with 10 μl. of an equivolume mixture of the antibody solution and the labeled morphine solution.

The data given for urine samples 1–5 in Table III are the percent increases for a randomly selected set of urine samples from people who had taken no narcotic agents for at least one week. Urine samples 6–10 in Table III were from known heroin addicts and patients known to be taking codeine. The high percentage increases for the latter group demonstrate the efficacy of the assay technique.

TABLE III

| Controls | | Study group | | |
|---|---|---|---|---|
| Urine sample No. | Percent signal increase | Urine sample No. | Percent signal increase | Drug taken |
| (1) | 6 | (6) | 58 | Heroin. |
| (2) | 3 | (7) | 81 | Do. |
| (3) | 5 | (8) | 100 | Do. |
| (4) | 7 | (9) | 75 | Codeine. |
| (5) | 4 | (10) | 62 | Do. |

As a demonstration of the sensitivity of the method, the results of the ligand assay technique were compared with the present commercial TLC test. In the TLC test, morphine is removed from the urine by solvent extraction and, after evaporation of the extracts, the residue is analyzed by thin layer chromatography. Since the morphine glucuronide is not extracted with benzene, only morphine is detected, and the test is relatively insensitive. In Table IV the results of the two assay methods are compared for the urine from a single heroin user who admitted taking the drug on the second and fifth days. It is apparent from the data that the ligand assay technique permits detection of the drug even three days after it was taken. This conclusion was verified by comparing the data with data obtained on the same urine samples using an improved TLC technique in which the morphine glucuronide is first hydrolyzed with acid to give free morphine. These data are included for comparison in Table IV. Although the improved TLC technique is still not as sensitive as the hapten assay technique, the results provide confirmation that the labeled ligan technique gives valid data.

TABLE IV

| Day | Percent signal increase | TLC results | Improved TLC results |
|---|---|---|---|
| 1 | 17 | − | + |
| 2 | 57 | + | + |
| 3 | 32 | − | + |
| 4 | 26 | − | + |
| 5 | 47 | + | + |
| 6 | 26 | − | + |
| 7 | 16 | − | − |
| 8 | 8 | − | − |
| 9 | 40 | + | + |

The subject method, by employing compounds of the subject invention in combination with antibodies prepared in accordance with the subject invention, provides a rapid and convenient method for accurately determining a wide variety of biologically interesting materials. Furthermore, by contrast with prior art methods, the subject method provides a higher degree of accuracy and freedom from other interfering materials. Since the radical ligand analog can be prepared with minimum interference with the spatial geometry and salient polar features of the molecule, and there is no concern with retention of the physiological activity of the molecule to be assayed, the method is exteremely versatilie. In addition, reagents can be prepared and kept for long periods of time without significant change in activity or easily calibrated, and determinations rapidly made without extensive manipulation or long periods of waiting. Isolation or substantial separation of the material to be assayed from other groups is generally not required. The use of radio isotopes which are frequently danagerous and have difficulties in manipulation is avoided. Also, the subject method does not suffer from the disadvantages of the colormetric techniques, which cannot be carried out in opaque or turbid solutions.

What is claimed is:

1. A method for detecting the presence of a ligand in a medium comprising:
   combining the medium suspected of having the ligand with (1) a ligand analog
   and (2) a receptor,
   wherein the ligand analog consists of a moiety resembling at least a part of the spatial and polar organization of said ligand, so as to be capable of competing with said ligand for said receptor, bound to a free radical group exhibiting an electron spin resonance spectrum, and
   said receptor is capable of combining with said ligand and said analog, and
   determining at least one point of said spectrum of said analog as compared to the spectrum of said analog treated in the same manner except for the absence of said ligand.

2. A method according to claim 1, wherein said analog is initially reversibly bound to said receptor and thereafter said medium suspected of containing said ligand is added.

3. A method according to claim 1, wherein said receptor is an antibody.

4. A method according to claim 1, wherein said free radical group has a nitroxide functionality.

5. A method according to claim 1, wherein said ligand analog is the ligand bonded through a linking group to a heterocyclic nitroxide free radical compound having a ring of from 5 to 6 annular members. wherein the nitrogen of the nitroxide group is a heteroannular member.

6. A method according to claim 5, wherein said ligand is a steroid hormone.

7. A method according to claim 5, wherein said ligand is a polypeptide hormone.

8. A method according to claim 5, wherein said ligand is a narcotic.

9. A method according to claim 8, wherein said narcotic is morphine.

10. A method according to claim 8, wherein said narcotic is codeine.

11. A method according to claim 5, wherein said ligand is an amphetamine.

12. A method according to claim 5, wherein said ligand is a barbiturate.

13. A method according to claim 5, wherein said ligand is morphine and said heterocyclic nitroxide is 2,2,5,5-tetramethyl-1-pyrrolidinooxyl.

14. A method according to claim 5, wherein said ligand is morphine and said heterocyclic nitroxide is 2,2,6,6-tetramethyl-1-piperidinooxyl.

15. A method according to claim 5, wherein said ligand is meperidine and said heterocyclic nitroxide is 2,2,5,5-tetramethyl-1-pyrrolidinooxyl.

16. A method according to claim 5, wherein said ligand is meperidine and said heterocyclic nitroxide is 2,2,6,6-tetramethyl-1-piperidinooxyl.

17. A method according to claim 5, wherein said ligand is ecgonine.

18. A method according to claim 5, wherein said ligand is amphetamine and said heterocyclic nitroxide is 2,2,5,5-tetramethyl-1-pyrrolidinyloxyl.

19. A method according to claim 5, wherein said ligand is cocaine.

20. A method according to claim 5, wherein said ligand is methadone.

21. A method according to claim 5, wherein said ligand is glutethimide.

22. A method according to claim 5, wherein said ligand is propoxyphene.

23. A method for detecting the presence of a ligand in a medium, wherein said ligand has at least one polar site and is from about 125 to 5,000 molecular weight, which comprises:

combining the medium suspected of having said ligand with (1) a ligand analog and (2) an antibody, wherein said ligand analog consists of a moiety resembling at least a part of the spatial and polar organization of said ligand, so as to be capable of competing with said ligand for said antibody, bound to a free radical nitroxide group exhibiting an electron resonance spectrum, and said antibody is capable of combining with the said ligand and said ligand analog, and determining at least one point of said spectrum of said ligand analog as compared to the spectrum of said ligand analog treated in the same manner, except for the absence of said ligand.

24. A method according to claim 23, wherein said ligand is a drug.

25. A method according to claim 23, wherein said ligand is a drug metabolite.

26. A method according to claim 23, wherein said ligand is a steroid.

27. A method according to claim 23, wherein said change in said spectrum is due at least in part to a change in mobilization of the spin of said free radical nitroxide group.

28. A method for detecting the presence of a ligand in a medium, wherein said ligand has at least one polar group and a molecular weight in the range of about 125 to 5,000 comprising:

combining (1) a ligand analog with (2) an antibody, wherein said ligand analog consists of a moiety resembling at least a part of the spatial and polar organization of said ligand, so as to be capable of competing with said ligand for said antibody, bound to a free radical nitroxide group exhibiting an electron spin resonance spectrum, and said antibody is capable of combining with said ligand and said ligand analog, admixing said medium suspected of having said ligand with the combination of said ligand analog and said antibody so as to competitively displace at least some of said ligand analog from said antibody, and detecting the change in at least one point of the electron spin resonance spectrum caused by the displacement.

29. A method according to claim 28, wherein said ligand is a drug.

30. A method according to claim 28, wherein said ligand is a drug metabolite.

31. A method according to claim 28, wherein said ligand is a steroid.

32. A method according to claim 28, wherein said change in said spectrum is due at least in part to a change in mobilization of the spin of said free radical nitroxide group.

33. A method for detecting the presence of a ligand in a medium, wherein said ligand has at least one polar site and a molecular weight in the range of about 125 to 5,000, comprising:

combining (1) the medium suspected of having a ligand with (2) an antibody, admixing a ligand analog with the combination of said medium and said antibody, wherein the ligand analog consists of a moiety resembling at least a part of the spatial and polar organization of said ligand, so as to be capable of competing with said ligand for said antibody, bound to a free radical nitroxide group exhibiting an electron spin resonance spectrum, and said antibody is capable of combining with said ligand and said analog, and determining at least one point of said spectrum of said ligand analog as compared to said spectrum of said ligand analog treated in the same manner except for the absence of said ligand.

34. A method according to claim 33, wherein said ligand is a drug.

35. A method according to claim 33, wherein said ligand is a drug metabolite.

36. A method according to claim 33, wherein said ligand is a steroid.

37. A method according to claim 33, wherein said change in said spectrum is due at least in part to a change in mobilization of the spin of said free radical nitroxide group.

38. A method for detecting the presence of a ligand in a medium, wherein said ligand has at least one polar site and a molecular weight in the range of about 125 to 5,000, comprising:

combining (1) the medium suspected of having said ligand with (2) said ligand analog, and admixing the combination of said medium and said ligand analog with an antibody, wherein the ligand analog consists of a moiety resembling at least a part of the spatial and polar organization of said ligand, so as to be capable of competing with said ligand for said antibody, bound to a free radical nitroxide group exhibiting an electron spin resonance spectrum, and said antibody is capable of combining with said ligand and said analog, and determining at least one point of said spectrum of said ligand analog as compared to said spectrum of said ligand analog treated in the same manner except for the absence of said ligand.

39. A method according to claim 38, wherein said ligand is a drug.

40. A method according to claim 38, wherein said ligand is a drug metabolite.

41. A method according to claim 38, wherein said ligand is a steroid.

42. A method according to claim 38, wherein said change in said spectrum is due at least in part to a change in mobilization of the spin of said free radical nitroxide group.

References Cited

UNITED STATES PATENTS 3,481,952  12/1969  McConnell et al. __ 23—230 R X
3,502,692   3/1970  Feldman et al. __ 260—326.62 X JOSEPH SCOVRONEK, Primary Examiner U.S. Cl. X.R.

23—230 B, 253 TP; 195—103.5; 260—239 BD, 239.5, 239.57, 243 A, 260, 281, 285, 292, 293.54, 293.55, 293.64, 293.71, 293.72, 293.73, 293.78, 293.79, 293.8, 293.81, 293.82, 293.83, 326.3, 345.3, 397, 397.3, 397.5, 488 CD, 570 R, 570.8 R